: US 10,224,851 B2

(12) United States Patent
Huh et al.

(10) Patent No.: US 10,224,851 B2
(45) Date of Patent: *Mar. 5, 2019

(54) SYSTEM AND METHOD FOR SENSORLESS CONTROL OF ELECTRIC MACHINES USING MAGNETIC ALIGNMENT SIGNATURES

(71) Applicant: General Electric Company, Schenectady, NY (US)

(72) Inventors: Kum-Kang Huh, Niskayuna, NY (US); Di Pan, Schenectady, NY (US)

(73) Assignee: General Electric Company, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/784,696

(22) Filed: Oct. 16, 2017

(65) Prior Publication Data

US 2018/0109219 A1 Apr. 19, 2018

Related U.S. Application Data

(63) Continuation of application No. 15/295,830, filed on Oct. 17, 2016, now Pat. No. 9,948,224.

(51) Int. Cl.
*H02P 21/24* (2016.01)
*H02P 27/08* (2006.01)
(Continued)

(52) U.S. Cl.
CPC .............. *H02P 21/24* (2016.02); *H02P 6/183* (2013.01); *H02P 21/18* (2016.02); *H02P 21/26* (2016.02); *H02P 27/08* (2013.01)

(58) Field of Classification Search
CPC ...... H02P 6/183; H02P 6/185; H02P 2203/11; H02P 6/181; H02P 6/22; H02P 2207/05
See application file for complete search history.

(56) References Cited

U.S. PATENT DOCUMENTS 5,565,752 A 10/1996 Jansen et al.
5,585,709 A 12/1996 Jansen et al.
(Continued)

FOREIGN PATENT DOCUMENTS

EP 1 492 224 A1 12/2004

OTHER PUBLICATIONS

Bianchi et al., "Effect of Stator and Rotor Saturation on Sensorless Rotor Position Detection," IEEE Transactions on Industry Applications, vol. 49, No. 3, pp. 1333-1342, May/Jun. 2013.
(Continued)

*Primary Examiner* — Thai Dinh
(74) *Attorney, Agent, or Firm* — Ziolkowski Patent Solutions Group, SC; Jean K. Testa

(57) ABSTRACT

A system and method for position sensorless control of an AC electric machine is disclosed. A drive system for driving an AC electric machine provides a primary current excitation to drive the AC electric machine, the primary current excitation comprising a current vector having a magnitude and angle. The drive system injects a carrier signal to the AC electric machine that is superimposed onto the current vector, with the carrier signal generating a carrier response signal responsive to the injected carrier signal. The drive system measures at least one magnetic alignment signature of the AC electric machine from the generated carrier response signal and controls an orientation of the current vector using the measured at least one magnetic alignment signature to operate the AC electric machine.

20 Claims, 22 Drawing Sheets

(51) Int. Cl.
*H02P 21/18* (2016.01)
*H02P 6/18* (2016.01)
*H02P 21/26* (2016.01)

(56) References Cited

U.S. PATENT DOCUMENTS

| | | | |
|---|---|---|---|
| 5,886,498 A | 3/1999 | Sul et al. | |
| 6,058,596 A | 5/2000 | Jansen et al. | |
| 6,069,467 A | 5/2000 | Jansen | |
| 6,131,258 A | 10/2000 | Saenger et al. | |
| 6,137,258 A | 10/2000 | Jansen | |
| 6,185,115 B1 | 2/2001 | Sul et al. | |
| 6,388,420 B1 | 5/2002 | Jansen et al. | |
| 6,515,395 B1 | 2/2003 | Jansen | |
| 6,639,380 B2 | 10/2003 | Sul et al. | |
| 6,874,221 B2 | 4/2005 | Jansen et al. | |
| 6,894,454 B2 | 5/2005 | Patel et al. | |
| 6,924,617 B2 | 8/2005 | Schulz et al. | |
| 6,989,641 B2 | 1/2006 | Schulz et al. | |
| 7,002,318 B1 | 2/2006 | Schulz et al. | |
| 7,282,886 B1 | 10/2007 | Patel et al. | |
| 7,548,038 B2 | 6/2009 | Atarashi et al. | |
| 7,843,162 B2 | 11/2010 | Bae et al. | |
| 7,893,639 B2 | 2/2011 | Tomigashi | |
| 8,022,660 B2 | 9/2011 | Kinpara et al. | |
| 8,159,161 B2 | 4/2012 | Tomigashi | |
| 8,519,649 B2 | 8/2013 | Taniguchi et al. | |
| 8,786,230 B2 * | 7/2014 | Lee | H02P 6/18 318/400.32 |
| 8,847,528 B2 | 9/2014 | Kato et al. | |
| 8,963,459 B2 * | 2/2015 | Kim | H02P 6/183 318/400.02 |
| 9,035,581 B2 * | 5/2015 | Hirono | H02P 6/182 318/400.02 |
| 9,093,878 B2 | 7/2015 | Huh et al. | |
| 9,112,445 B2 | 8/2015 | Sul et al. | |
| 9,225,225 B2 * | 12/2015 | Rozman | H02P 6/183 |
| 9,257,933 B2 | 2/2016 | Ha et al. | |
| 9,300,234 B2 * | 3/2016 | Kakihara | H02P 6/183 |
| 9,407,188 B2 * | 8/2016 | Yoo | H02P 21/0017 |
| 2008/0048599 A1 | 2/2008 | Ho | |
| 2010/0026223 A1 | 2/2010 | Liu et al. | |
| 2010/0045218 A1 * | 2/2010 | Tomigashi | H02P 6/183 318/400.02 |
| 2010/0207555 A1 * | 8/2010 | Ide | H02P 21/32 318/400.02 |
| 2010/0301790 A1 | 12/2010 | Liu et al. | |
| 2010/0308757 A1 | 12/2010 | Ide et al. | |
| 2014/0028237 A1 | 1/2014 | Park et al. | |
| 2014/0117791 A1 | 5/2014 | Fiseni et al. | |
| 2015/0100264 A1 * | 4/2015 | Qian | G01D 5/2046 702/94 |
| 2015/0381095 A1 | 12/2015 | Park et al. | |
| 2016/0268950 A1 | 9/2016 | Cho et al. | |

OTHER PUBLICATIONS

Corley et al., "Rotor Position and Velocity Estimation for a Permanent Magnet Synchronous Machine at Standstill and High Speeds," Conference Proceedings of IEEE Industry Application Society Annual Meeting, San Diego, CA, pp. 36-41, Oct. 6-10, 1996.

Raca, D., et al., "A comparative Analysis of Pulsating vs. Rotating Vector Carrier Signal Injection-Based Sensorless Control," Applied Power Electronics Conference and Exposition, pp. 879-885 (Feb. 2008).

Raca, D., et al., "Carrier-Signal Selection for Sensorless Control of PM Synchronous Machines at Zero and Very Low Speeds," IEEE Transactions on Industry Applications, vol. 46, No. 1, pp. 167-178 (Jan./Feb. 2010).

Reigosa, D. D., et al., "Measurement and Adaptive Decoupling of Cross-Saturation Effects and Secondary Saliencies in Sensorless Controlled IPM Synchronous Machines," IEEE Transactions on Industry Applications, vol. 44, No. 6, pp. 1758-1767 (Nov./Dec. 2008).

Notice of Allowance towards corresponding U.S. Appl. No. 15/295,830 dated Dec. 14, 2017.

Extended European Search Report and Opinion issued in connection with corresponding EP Application No. 17196147.7 dated Feb. 21, 2018.

* cited by examiner (a) 0% CURRENT (b) 100% CURRENT

| ITEMS | PRIOR ART | | SELECTED MAGNETIC ALIGNMENT SIGNATURES | | | | | | | | |
|---|---|---|---|---|---|---|---|---|---|---|---|
| | SALIENCY ANGLE | MAGNET POLARITY DETECT. | SALIENCY FRAME SIG. | | | CURRENT FRAME SIG. | | | | | TORQUE PULSATION |
| | | | Lmin, Rmax | Lmax, Rmin | L(avg) | Ldqi, Lqdi | Ldi | Lqi | Rdqi, Rqdi | Rdi | Rqi | |
| SIGNATURE SENSITIVITY FOR SENSORLESS CONTROL | | | | | | | | | | | | |
| ZERO CURRENT/ZERO TORQUE | GOOD | GOOD | | | | GOOD | GOOD | | | | | |
| LOW CURRENT/LOW TORQUE | GOOD | WEAK | FAIR (*) | FAIR (*) | GOOD | FAIR | GOOD | FAIR | GOOD | GOOD | FAIR | |
| MEDIUM CURRENT/MEDIUM TORQUE | | | FAIR (*) | FAIR (*) | FAIR | | GOOD | FAIR | GOOD | GOOD | FAIR | |
| HIGH CURRENT/HIGH TORQUE | | | | | | | FAIR | GOOD | FAIR | FAIR | GOOD | |
| SIGNATURE MEASURABILITY | | | | | | | | | | | | |
| ROTATING VECTOR INJECTION | | | | | | | | | | | | |
| ROTATING CURRENT VECTOR INJECTION | ○ | ○(L) | ○ | ○ | | ○ | ○ | ○ | ○ | ○ | ○ | HIGH |
| ROTATING VOLTAGE VECTOR INJECTION | ○ | ○(L) | ○ | ○ | | ○ | ○ | ○ | ○ | ○ | ○ | HIGH |
| ELLIPTICAL EXCITATION | ○ | ○(L) | ○ | ○ | | ○ | ○ | ○ | ○ | ○ | ○ | CAN BE REDUCED |
| PULSATING VECTOR INJECTION | | | | | | | | | | | | |
| SALIENCY D-AXIS TRACKING INJECTION | ○ | ○(L) | ○ | | | | | | | | | LOW (L), HIGH (H) |
| SALIENCY Q-AXIS TRACKING INJECTION | ○ | | | ○ | | | | | | | | HIGH |
| CURRENT FRAME D-AXIS CURRENT INJECTION | | ○(L) | | | | | | | | | | LOW |
| CURRENT FRAME Q-AXIS CURRENT INJECTION | | | | | | ○ | ○ | ○ | | | | HIGH |
| CURRENT FRAME D-AXIS VOLTAGE INJECTION | | ○(L) | | | | ○ | | | | ○ | | LOW (L), HIGH (H) |
| CURRENT FRAME VOLT.INJ.W /MIN.TORQUE RIPPLE | | ○(L) | | | | | | | | | | LOW |
| CURRENT FRAME Q-AXIS VOLTAGE INJECTION | | △(L) | | | | | | | | | ○ | HIGH |
| SWITCHING BETWEEN DI-AXIS & QI-AXIS INJECTION | | △(L) | | | | △ | △ | △ | △ | △ | △ | LOW (L), HIGH (H) |
| PROFILED CURRENT FRAME INJECTION ANGLE | | | | | | | △ | △ | △ | △ | △ | LOW (L), HIGH (H) |
| BLENDED INJECTION (ROTATING & PULSATING) | | | | | | ○ | ○ | ○ | ○ | | | |
| QI-AXIS INJ. AT TRANSIENT & VERY HIGH TORQUE | △ | △(L) | △ | △ | △ | | | | | | △ | LOW (L-M) |

(*): THERE EXISTS OPERATING POINTS WHERE SENSITIVITY IS LIMITED  
○: CAN BE MEASURED  
△: CAN BE MEASURED CONDITIONALLY  
(L): LOW CURRENT LEVEL  
(M): MEDIUM CURRENT LEVEL  
(H): HIGH CURRENT LEVEL  
BLANK: CAN NOT BE USED OR EFFECTIVE

FIG. 21

SYSTEM AND METHOD FOR SENSORLESS CONTROL OF ELECTRIC MACHINES USING MAGNETIC ALIGNMENT SIGNATURES

CROSS-REFERENCE TO RELATED APPLICATION

The present application is a continuation of, and claims priority to, U.S. patent application Ser. No. 15/295,830, filed Oct. 17, 2016, the disclosure of which is incorporated herein by reference in its entirety.

BACKGROUND OF THE INVENTION

Embodiments of the invention relate generally to electric machines and, more particularly, to a sensorless method for controlling an electric machine via the use of signatures that are produced by the saturation behavior of the electric machine dependent on an alignment of excitation current provided to the stator thereof.

The usage of electric machines in various industries has continued to become more prevalent in numerous industrial, commercial, and transportation industries over time. With an electric machine, be it an interior electric machine (IPM) machine, permanent magnet (PM) assisted synchronous reluctance machine, or a synchronous reluctance machine, position determination of the rotor or the magnetic field is a critical informational element for torque control of the machine.

For purposes of determining rotor position in an electric machine, an encoder, tachometer, or resolver may be used as the position sensor. For measuring the magnetic field position in the electric machine, magnetic field sensors such as Hall effect sensors may be used. The sensors/devices utilized for determining the rotor position and magnetic field may be used in combination with one another, with it being recognized that position sensor or rotor position sensors and magnetic field sensors for measuring magnetic field orientation or strength may both be employed for the purpose of electric machine control. It is recognized, however, that the position sensor (e.g., encoder), along with its cabling and interface electronics, contributes to a significant portion of the motor drive system cost and overall complexity and is often a major reliability concern. The cost, complexity, and reliability issues associated with the use of position sensors in determining rotor position has led to the advent of systems and methods of sensorless position sensing and control of electric machines (i.e., not requiring rotor position or speed sensors). Because of the tremendous potential of cost reduction and reliability improvement, sensorless control has been a major research challenge. Most of the sensorless control methods that are available in industries are so called Back-EMF tracking approaches. Back-EMF tracking methods utilize the voltage of the motor winding induced by the time variation of the flux-linkage caused by the rotation of the rotor. These methods perform very well near the rated speed where the back-EMF voltage is close to rated voltage. However, as the speed is reduced, the back-EMF magnitude is reduced and performance is deteriorated. Eventually, as the speed is close to zero, these methods become unstable and fail, because the back-EMF diminishes and becomes unobservable. This limits back-EMF tracking methods to HVAC type of applications where open-loop starting is acceptable.

Owing to its tremendous potential of cost reduction, reliability improvement, and elimination of interfaces, zero and near zero speed (or frequency) sensorless control has been a major research challenge for decades, and high frequency injection methods have been the most promising solution for the sensorless operation on or near zero frequency for AC electric machines with saliency. High frequency signal injection is used to track the rotor angular position and velocity of various AC electric machines having a rotor providing an impedance that varies with rotor position or flux position, such as described in U.S. Pat. Nos. 5,585,709; 5,565,752; 6,131,258; 6,069,467; 5,886,498; and 6,639,380, for example. In employing a high frequency signal injection technique, small signal saliency and small signal saliency angle is the key information used for sensorless control, with such saliency being defined using small signal impedance.

However, with respect to previously employed encoderless controls that employ high frequency injection, it is recognized such encoderless controls have failed to find success in recovering the full, or near full, torque capability of the machine due to the loss of small signal saliency at high-load levels for the machine, this being due to magnetic saturation at such high-load levels. That is, as the torque level (thus the current level) is increased, the q-axis starts to saturate and eventually small signal inductance of the q-axis becomes lower than the d-axis inductance, thereby making saliency tracking sensorless control infeasible. Moreover, a cross saturation effect causes the saliency angle to shift away from the d-axis, causing position estimation angle error even though the q-axis small signal inductance is still larger than d-axis. Therefore, existing high frequency injection methods have been limited to applications where torque density requirement is low and also the dynamic performance requirement is modest. Especially, for such applications as traction drives where vein high torque density is desired, existing sensorless control methods could achieve only a small fraction of the desired torque requirement, let alone the dynamic performance.

In an effort to address the saliency tracking limitations of the previously described high frequency injection method for zero frequency encoderless control, efforts have been made to incorporate design features into an electric machine (e.g., IPM machines or synchronous reluctance machine) that enable increased torque control without the use of any position sensor. That is, a special rotor structure—i.e., a "D-ring"—that increases magnetic saliency for high frequency excitation has been incorporated into the electric machine, wherein this high frequency excitation can be used for sensorless/encoderless motor control. The rotor structure introduces electrical circuits (shorted circuit, closed circuit with passive or active elements) to a specific orientation of the rotor so that it couples with the stator winding magnetically. The position of the rotor is measured by applying a high frequency carrier voltage to the stator and by indirectly measuring the current of the rotor, by measuring the (reflected) high frequency carrier current response in the stator. If the rotor circuit is aligned in phase with the high frequency injection, the impedance of the motor is reduced. This variation of impedance is used to track rotor position. As a result, small signal saliency up to necessary loading level is introduced and maintained without impact on the electric machine performance, efficiency, and reliability.

While the inclusion of such a special rotor structure or D-ring has enabled increased torque control of an electric machine via the use of high frequency injection sensorless controls, it is recognized that inclusion of such a D-ring in the electric motor may still not provide for full sensorless control of an electric machine, as even with a D-ring it is difficult to maintain a desired level of saliency during operation of the machine due to the severe saturation at very high torque level.

Therefore, it is desirable to provide a system and method for sensorless control of an electric machine that allows for control over a full operating range of speed and torque. It is further desirable for such a system and method to provide such sensorless control in a manner that overcomes the shortcomings associated with saliency tracking based control methods, such as the effects of magnetic saturation and phase error in position tracking and control of the machine.

BRIEF DESCRIPTION OF THE INVENTION

In accordance with one aspect of the invention, a drive system for driving an AC electric machine is configured to provide a primary current excitation to drive the AC electric machine, the primary current excitation comprising a current vector having a magnitude and angle. The drive system is also configured to inject a carrier signal to the AC electric machine that is superimposed onto the current vector, with the carrier signal being selected to generate a carrier response signal that has sensitivity to magnetic alignment information of the AC electric machine at its operating point. The drive system is further configured to measure at least one magnetic alignment signature of the AC electric machine from the generated carrier response signal and control an orientation of the current vector using the measured at least one magnetic alignment signature, so as to achieve a desired magnetic operation of the AC electric machine.

In accordance with another aspect of the invention, a method for position sensorless control of an AC electric machine includes generating a primary current excitation to drive the AC electric machine, the primary current excitation comprising a current vector having a current magnitude and current angle. The method also includes superimposing a high-frequency carrier voltage or current onto the current vector to generate a selected carrier response current or voltage, respectively, that has sensitivity to magnetic alignment information of the AC electric machine. The method further includes determining one or more magnetic alignment signatures of the AC electric machine from the carrier response current or voltage and controlling the current angle of the current vector driving the AC electric machine based on the one or more magnetic alignment signatures, in order to achieve a desired magnetic operation of the AC electric machine.

In accordance with yet another aspect of the invention, a drive system for use with an AC electric machine not having suitable sensitivity for saliency tracking sensorless control is provided. The drive system is configured to generate a primary excitation current vector to drive the AC electric machine, the primary excitation current vector having a current magnitude and current angle. The drive system is also configured to inject a carrier signal onto the primary excitation current vector, the carrier signal comprising one of a carrier voltage and a carrier current that is superimposed on the primary excitation current vector. The drive system is further configured to measure at least one magnetic alignment signature of the AC electric machine that is derived from a carrier response signal generated from the injected carrier signal and control an orientation of the primary excitation current vector using the measured at least one magnetic alignment signature, so as to achieve a desired magnetic operation of the AC electric machine.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings:

FIG. 21 is a table setting forth the various injection methods that might be injected and the various magnetic alignment signatures that might be measured, as compared to the prior art injection methods and measured magnetic alignment signatures, according to embodiments of the invention.

DETAILED DESCRIPTION

Figure 1A:
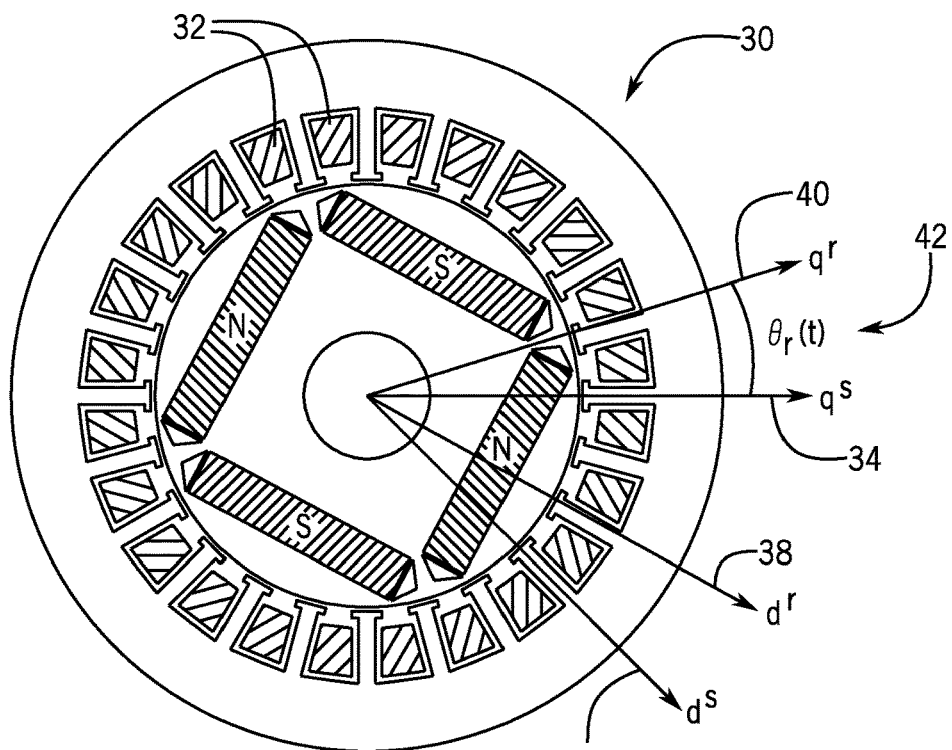
FIGS. 1A and 1B are illustrations of multi-phase AC electric machines with a stationary reference frame and rotor frame defined thereon.

For purposes of better understanding the descriptions set forth herebelow, the following listing of the nomenclature and abbreviations which will be used is provided.
Reference Frame Unit Vectors for AC Machines
$q^s$ stationary frame quadrature axis; aligned with a-phase in general
$d^s$ stationary frame direct axis;
$q^r$, q rotor synchronous frame quadrature axis
$d^r$, d rotor synchronous frame direct axis
$q^i$ current frame quadrature axis
$d^i$ current frame quadrature axis
q quadrature axis of the specified reference frame (rotor frame if not specified)
d quadrature axis of the specified reference frame (rotor frame if not specified)
Complex Vectors for AC Machine Variables (and Vector Generalization)
f bold characters used for complex vectors and complex coefficients bold characters used for vectors and matrices
$f_{qd} = f_q - j \cdot f_d$ complex vector representation for ac machine variables
$f_{qd} = [f_q \ f_d]^T$ 2D vector representation of a complex vector
j complex number operator $\sqrt{-1}$
j rotation matrix of 90 degrees (matrix equivalent of j)
Superscripts for Reference Frame Identification
$f^s$ complex vector or 2D referred from the stationary reference frame
$f^r$ complex vector referred from the rotor reference frame
f complex vector referred from the rotor reference frame (reference frame subscript is omitted)
$f^i$ complex vector referred from the current reference frame
Symbols for Physical Quantities
v voltage
i current
$\lambda$ flux linkage
e back-EMF voltage
$\theta$, $\omega$ angular position and angular velocity of a reference frame
$\theta_r$, $\omega_r$ electrical rotor angular position and rotor angular velocity
$\theta_m$, $\omega_m$ mechanical rotor angular position and rotor angular velocity
$T_{em}$ electromagnetic torque of a electric machine
$T_L$ load torque
Superscripts for Variable Identifications
• differentiated quantity
∧ estimated quantity
~ scaled quantity
* commanded or reference quantity
Electric Machine Parameters
P number of poles
M number of stator phases
$L_s$, L stator inductance
r resistance matrix of an asymmetric machine
L inductance matrix of an asymmetric machine
$L_q$ q-axis inductance
$L_d$ d-axis inductance
$L_{qd}$, $L_{dq}$ mutual inductances between q and d axis windings With respect to the subsequent discussion of AC electric machines, reference frames are defined in order to represent the physical quantities of the phase winding domains variables as two-dimensional space vectors. For purposes of better explanation, reference is made to FIGS. 1A and 1B—which illustrates cutaway views of AC electric machines 30 and the placements of various reference frames thereon, including the stationary (or stator) reference frame and the rotor reference frame.

Among the multiple-phases of the stator windings 32 of the machine, one phase is used as the reference and is ordered as the 1st stator phase. The stationary reference frame quadrature axis ($q^s$-axis) 34 is defined as the unit vector in which direction the air-gap magnetomotive force (MMF) is maximum when the positive current is applied to the 1st stator phase. The stationary reference frame direct axis ($d^s$-axis) 36 is defined as the unit vector, whose angle is at negative 90 electrical degrees from the $q^s$-axis direction.

For a machine with a permanent magnet rotor, the rotor reference frame direct axis (dr-axis) 38 is defined as the unit vector, in which direction the permanent magnet north pole is aligned—such that the air-gap magnetomotive force (MMF) is maximum. The rotor reference frame quadrature axis ($q^r$-axis) 40 is defined as the unit vector whose angle is at 90 electrical degrees from the $d^r$-axis. For the rotor reference frame, the superscript 'r' is often omitted. As shown in FIG. 1A, the electrical angle of the rotor reference frame from the stationary reference frame is defined as the electrical rotor angular position $\theta_r$ 42.

For a reluctance machine, the rotor reference frame definition can be extended from the definition of the permanent magnet machine, by simply keeping the same frame definition and by assuming the permanent magnets are not present in the rotor. In order to maintain the magnetic similarity of the reluctance machine to interior permanent magnet (IPM) machines, the rotor frame d-axis (dr-axis) is aligned with the minimum inductance axis.

Figure 1B:
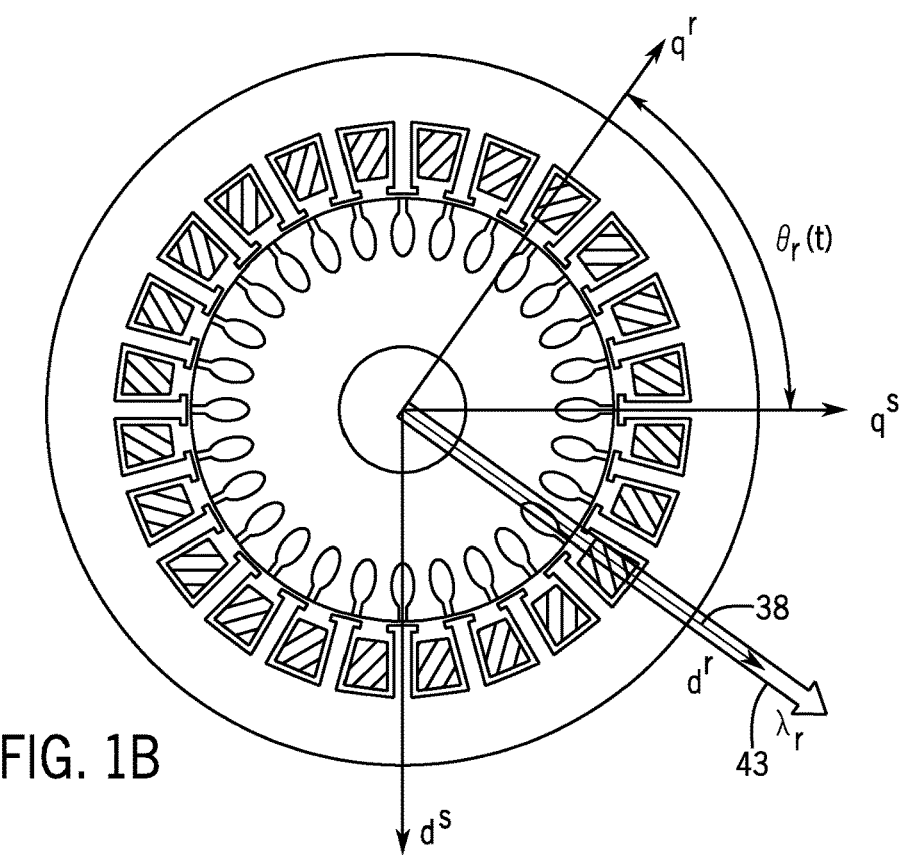

For the purpose of field oriented vector control of an induction machine, the rotor reference frame can be aligned with the rotor flux vector $\lambda_r$ 43, as shown in FIG. 1B specifically as the rotor frame d-axis (dr-axis) 38.

The definition of a complex vector for stator variables in the stationary reference frame is defined as the summation of all the phase variables $f_{ms}$ represented as complex vector being described as:

$$f_{qd}^s = f_q^s - jf_d^s = \frac{2}{M} \sum_{m=1}^{M} f_{ms} e^{j\frac{2\pi(m-1)}{M}}$$ [Eqn. 1]

$$f_{qd}^s = f_q^s - jf_d^s = \frac{2}{M} \sum_{m=1}^{M} f_{ms} e^{j\frac{2\pi(m-1)}{M}}$$

$$f_q^s = \frac{2}{M} \sum_{m=1}^{M} f_{ms} \cos\frac{2\pi(m-1)}{M}$$

$$f_d^s = -\frac{2}{M} \sum_{m=1}^{M} f_{ms} \sin\frac{2\pi(m-1)}{M},$$

Where M is the number of stator phases and j is a complex number operator. The same stator variable can be represented as a 2-dimensional vector as:

$$f_{qd}^s = \begin{Bmatrix} f_q^s \\ f_d^s \end{Bmatrix}.$$ [Eqn. 2]

This stationary reference frame variable can be transformed to rotor reference frame using the following operation:

$$f_{qd}^r = f_{qd}^s e^{-j\theta_r} = f_q^r - jf_d^r$$

$$f_q^r = f_q^s \cos\theta_r - f_d^s \sin\theta_r$$

$$f_d^r = f_q^s \sin\theta_r + f_d^s \cos\theta_r$$ [Eqn. 3].

Inverse transformation to stationary reference frame from the rotor reference frame variable can then be performed according to:

$$f_{qd}^s = f_{qd}^r e^{j\theta_r} = f_q^s - jf_d^s$$

$$f_q^s = f_q^r \cos\theta_r + f_d^r \sin\theta_r$$

$$f_d^s = -f_q^r \sin\theta_r + f_d^r \cos\theta_r$$ [Eqn. 4].

According to embodiments of the invention, a system and method for sensorless control of an electric machine that allows for control over a full operating range of speed and torque are provided. A drive system that drives the electric machine includes a signal injector that operates to inject high frequency carrier signals, which are then combined/superimposed with a primary excitation vector. Here, primary component of an electric machine variable, such as voltage, current, and flux and etc., is a low frequency component of the variable that is not the high frequency carrier injection signal or the carrier response signal. A rotor position estimator of the drive system monitors a magnetic alignment signature of the electric machine derived from small signal inductances and/or small signal reluctances in order to estimate a magnetic alignment of the electric machine and provide sensorless control thereof. The injection of the high frequency carrier signal may be provided as either rotating vector injection, pulsating vector injection, or a blended rotating and pulsating vector injection, and an optimal magnetic alignment signature may be measured and tracked, such that rotor position estimation and sensorless control of the electric machine may be provided.

As used herein, the term "sensorless," denotes the absence of traditional rotor position or velocity shaft transducers such as encoders, resolvers, or tachometers, while the term "magnetic alignment signature" is understood to refer to a measurable parameter or signature that is derived from saturation behavior or the saliency of the electric machine dependent on a magnetic alignment (i.e., current angle γ) of excitation current provided to the stator thereof. That is, for an electric machine with inductance saliency—such as an interior permanent magnet synchronous motor (IPMSM), PM assisted synchronous reluctance machine, synchronous reluctance machine, saliency pole wound field machine, etc.—the high inductance magnetic path of the machine is saturated by excitation current much easier compared to the low inductance path. Therefore, given a high enough excitation current, the magnetic saturation is intensified as the excitation current is aligned closer to the high inductance axis—which, for example, would be the q-axis of an IPM machine and/or the d-axis of a salient pole wound field synchronous machine. This magnetic saturation results in a significant drop in small signal inductance of the high inductance axis, while—to the contrary—as the excitation current is aligned closer to the low inductance axis (e.g., d-axis of an IPM machine), the magnetic core of the electric machine comes out of saturation. This saturation behavior of an electric machine has strong sensitivity to the alignment of the motor current orientation relative to the rotor position and can be used for estimation of the rotor position of the electric machine, for purposes of sensorless control. "Magnetic alignment" can be defined using current angle, an angle that can be defined as the angle of the current vector either in reference to a rotor features such as rotor pole or rotor magnet orientation, or in reference to the flux orientation of the electric machine such as the stator flux or rotor flux. Typically, the current angle has strong relationship with the output torque produced by the electric machine, such that mapping between torque and the signatures can be established as well. It's reasonable to use magnetic alignment signatures to characterize the output torque of the electric machine.

Figure 2:
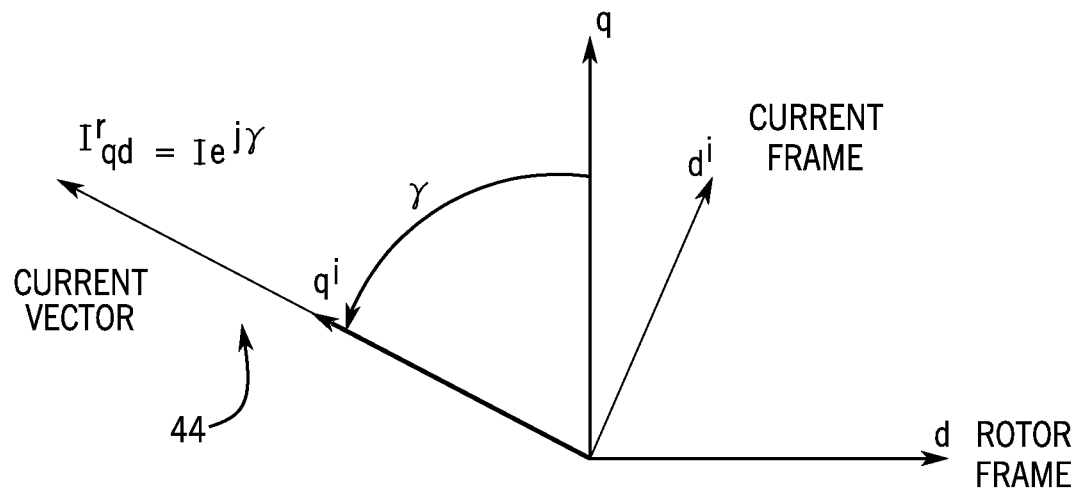
FIG. 2 is an illustration of an operating point current command vector relative to a defined rotor frame and current frame.

The saturation phenomena of the electric machine can be characterized by the inductances at the operating point (I, γ) of the machine, mainly the small signal inductances. An operating point current command vector 44 for the given operating point (I, γ) is illustrated in FIG. 2, with the operating point current command vector $I_{qd}^r$ 44 in the rotor reference frame being defined as:

$$I_{qd}^r = I_q^r - jI_q^r = Ie^{j\gamma}$$ [Eqn. 5]

$$I_{qd}^r = \begin{Bmatrix} I_q^r \\ I_d^r \end{Bmatrix}$$

$$I_q^r = I\cos\gamma, I_d^r = -I\sin\gamma, ,$$

where γ is the current angle and j is a complex number operator.

According to embodiments of the invention, one or more magnetic alignment signatures of the electric machine may be measured in order to determine "magnetic alignment information" of the electric machine. As will be explained in greater detail below, the operating point of the electric machine and the dynamic state of the machine dictate a preferred high frequency signal injection method and preferred magnetic alignment signature for determining magnetic alignment information of the electric machine, with load conditions, current level, and electric machine type, for example, determining the use of rotating vector injection, pulsating vector injection, or a blended rotating and pulsating vector injection, and measurement of a particular magnetic alignment signature.

One magnetic alignment signature that is measurable responsive to the providing of an operating point current command vector $I^r_{qd}$ 44 to the electric machine is a small signal inductance in the rotor reference frame. Given the operating point current command vector $I^r_{qd}$ and the corresponding operating point flux $\Lambda^r_{qd}$, the small signal inductances in the rotor reference frame can be defined as:

$$\lambda^r_{qd} - \Lambda^r_{qd} = \begin{bmatrix} L_q & L_{qd} \\ L_{qd} & L_d \end{bmatrix}(i^r_{qd} - I^r_{qd})$$

$$\delta\lambda^r_{qd} = \begin{bmatrix} L_q & L_{qd} \\ L_{qd} & L_d \end{bmatrix}\delta i^r_{qd},$$
[Eqn. 6]

where $L_q$ is the q-axis inductance, $L_d$ is the d-axis inductance, $L_{qd}$ and $L_{dq}$ are cross inductance values, $\delta i_{qd}$ is the small signal current variation vector from the operating point $I^r_{qd}$, and $\delta\lambda_{qd}$ is small signal flux variation vector from the operating point flux $\Lambda^r_{qd}$.

The inverse function of this small signal inductance can be also measured. These signatures can be referred to as inverse inductance or as reluctance R, and can be defined as:

$$\delta i^r_{qd} = \begin{bmatrix} \mathcal{R}_q & \mathcal{R}_{qd} \\ \mathcal{R}_{qd} & \mathcal{R}_d \end{bmatrix}\delta\lambda^r_{qd}.$$
[Eqn. 7]

Rotor frame signatures can be measured only if the rotor angle is known. Practically, without the knowledge of orientation of the rotor frame, the magnetic alignment signatures are measured in reference to a different frame from the actual rotor frame.

Figure 3:
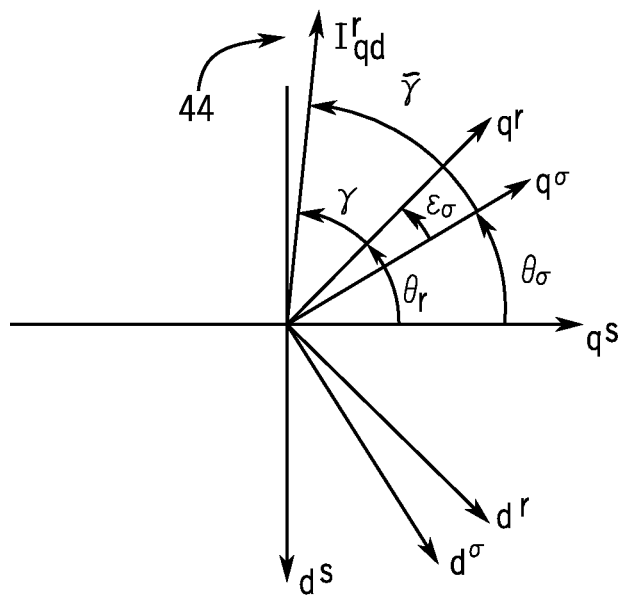
FIG. 3 is an illustration of an operating point current command vector relative to a saliency frame.

Another magnetic alignment signature that is measurable responsive to the providing of an operating point current command vector $I^r_{qd}$ 44 to the electric machine is a small signal inductance in the saliency frame, with illustration of operating point current command vector 44 in the saliency frame being provided in FIG. 3. Using high frequency injection methods, orientation of the magnetic saliency can be measured and magnetic alignment signatures can be represented in reference to the saliency frame. With respect to use of small signal inductance in the saliency frame as a magnetic alignment signature, it is recognized that—for a salient electric machine—the saliency reference frame should ideally be equivalent to the rotor reference frame. However, due to cross saturation and saliency crossover due to saturation of the magnetization path, the saliency frame deviates from the rotor frame. With the minimum inductance axis being defined as the d-axis of the saliency frame (where the inductance is minimized), the small signal inductances in the saliency frame can be defined as:

$$\delta\lambda^\sigma_{qd} = \begin{bmatrix} L_{max} & 0 \\ 0 & L_{min} \end{bmatrix}\delta i^\sigma_{qd},$$
[Eqn. 8]

where $L_{max}$ is the maximum inductance and $L_{min}$ is the minimum inductance.

The maximum inductance $L_{max}$ and the minimum inductance $L_{min}$ can be derived as follows:

$$L_{max} = L_\Sigma + L'_\Delta$$
$$L_{min} = L_\Sigma - L'_\Delta$$
$$L_\Sigma = \frac{L_q - L_d}{2}$$
$$L_\Delta = \frac{L_q - L_d}{2}$$
$$L'_\Delta = \sqrt{L^2_\Delta + L^2_{qd}}.$$
[Eqn. 9]

The inverse of maximum inductance $L_{max}$ can be defined as minimum reluctance $R_{min}$. The inverse of minimum inductance $L_{min}$ can be defined as maximum reluctance $R_{max}$. The average value of $R_{max}$ and $R_{min}$ can be defined as average reluctance as $R_\Sigma$.

To quantitatively assess the saliency, saliency $\sigma_s$ may be defined as the ratio of the maximum inductance $L_{max}$ to the minimum inductance $L_{min}$ according to:

$$\sigma_s(I, \gamma) = \frac{L_{max}}{L_{min}}.$$
[Eqn. 10]

A saliency angle error $\varepsilon_\sigma$ can also be derived according to:

$$\varepsilon_\sigma(I, \gamma) = \frac{1}{2}\tan^{-1}\left(\frac{2L_{qd}}{L_q - L_d}\right).$$
[Eqn. 11]

Use of rotating vector excitation allows the estimation of the complete $L_{max}$, $L_{min}$, and saliency angular position $\theta_\sigma$. Pulsating injection methods that track the d-axis can estimate the saliency angular position $\theta_\sigma$ and $L_{min}$, but $L_{max}$ cannot be estimated. Conversely, pulsating injection methods that track the q-axis can estimate $L_{max}$, but not $L_{min}$.

Based on these limitations of measuring small signal inductance in the saliency frame, another magnetic alignment signature that might be useful is small signal inductances or reluctances in the current reference frame, with illustration of an operating point current command vector in the current frame being provided in FIG. 2. The small signal inductances or reluctances in the current reference frame are measurable responsive to the providing of an operating point current command vector $I^r_{qd}$ 44 to the electric machine, with the current angle of the small signal inductances or reluctances being explicitly known through current measurement.

The small signal inductance in the current reference frame can be defined as:

$$\delta \lambda_{qd}^i = \begin{bmatrix} L_q^i & L_{qd}^i \\ L_{dq}^i & L_d^i \end{bmatrix} \delta i_{qd}^j, \quad \text{[Eqn. 12]}$$

where $L^i_q$ is the q-axis inductance in the current frame, $L^i_d$ is the d-axis inductance in the current frame, $\delta i^i_{qd}$ is the perturbed current on the d-axis or q-axis in the current frame as induced by the injected high frequency signal, and $L^i_{qd}$ and $L^i_{dq}$ are cross inductance values present due to cross saturation in the AC electric machine.

The small signal reluctance in the current reference frame can be defined as:

$$\delta i_{qd}^i = \begin{bmatrix} \mathcal{R}_q^i & \mathcal{R}_{qd}^i \\ \mathcal{R}_{dq}^i & \mathcal{R}_d^i \end{bmatrix} \delta \lambda_{qd}^i$$

which can be further divided into individual reluctance values (and defined in terms of inductance) according to:

$$\mathcal{R}_q^i = \frac{L_d^i}{L_q^i L_d^i - L_{qd}^i L_{dq}^i}, \mathcal{R}_{qd}^i = \frac{-L_{qd}^i}{L_q^i L_d^i - L_{qd}^i L_{dq}^i} \quad \text{[Eqn. 13]}$$

$$\mathcal{R}_{dq}^i = \frac{-L_{dq}^i}{L_q^i L_d^i - L_{qd}^i L_{dq}^i}, \mathcal{R}_d^i = \frac{L_q^i}{L_q^i L_d^i - L_{qd}^i L_{dq}^i},$$

where $R^i_q$ is the q-axis reluctance in the current frame, $R^i_d$ is the d-axis reluctance in the current frame, $\delta i^i_{qd}$ is the perturbed current on the d-axis or q-axis in the current frame as induced by the injected high frequency signal, and $R^i_{qd}$ and $R^i_{dq}$ are cross reluctance values present due to cross saturation in the AC electric machine.

Figure 4A:
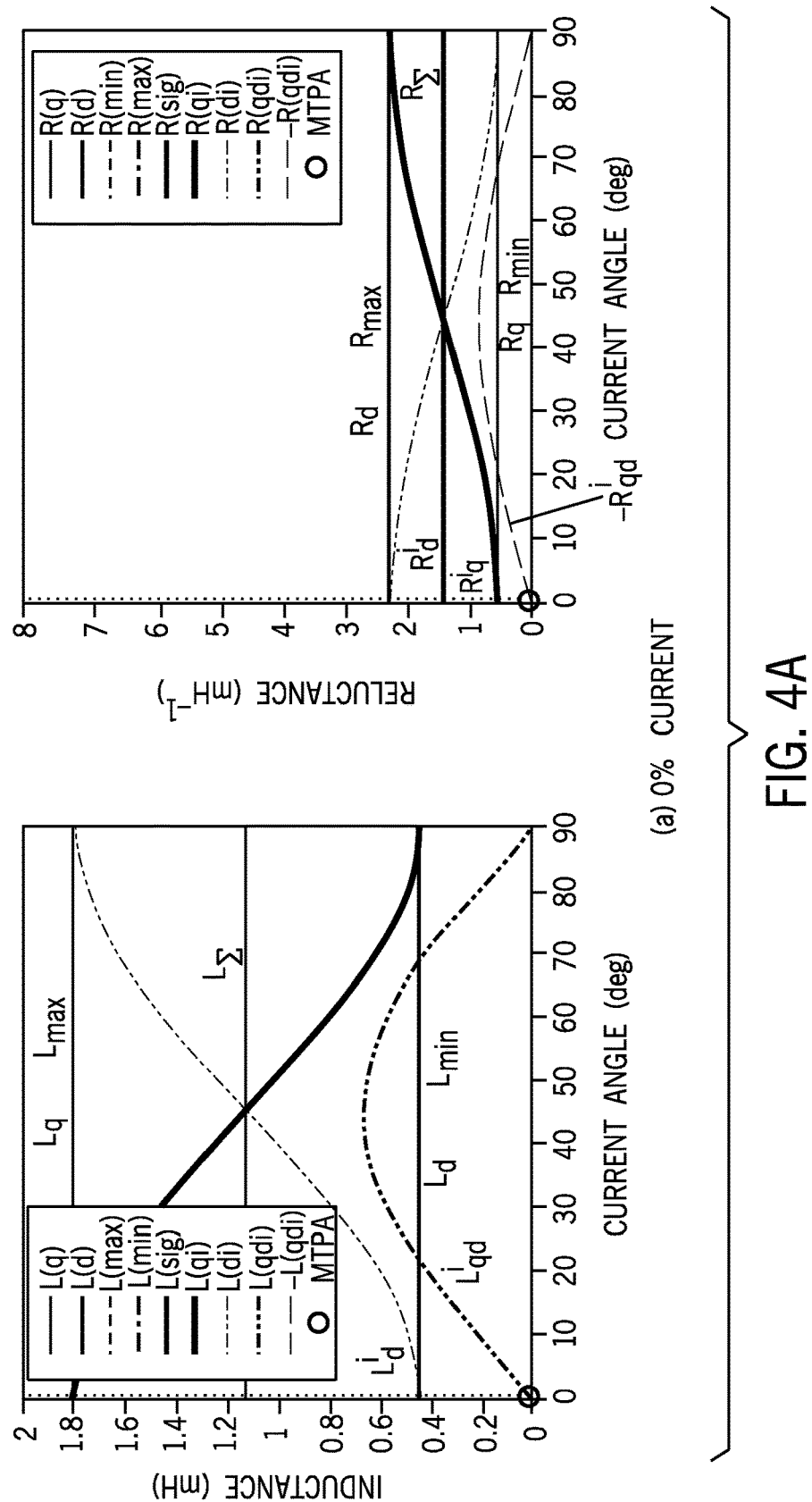
FIGS. 4A-4C are graphs illustrating small signal magnetic alignment signatures at various current levels for an exemplary IPM motor.
Figure 4B:
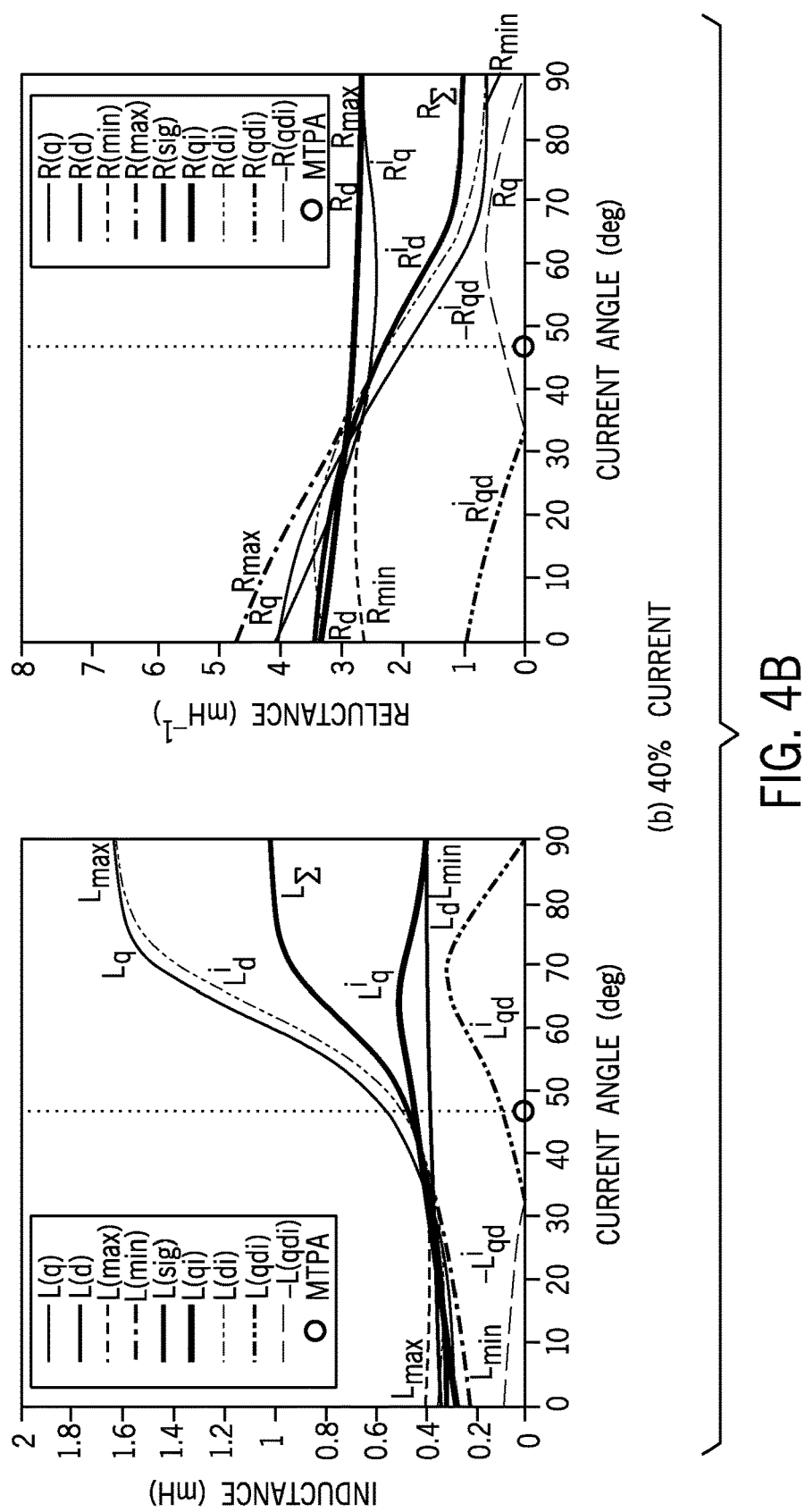
Figure 4C:
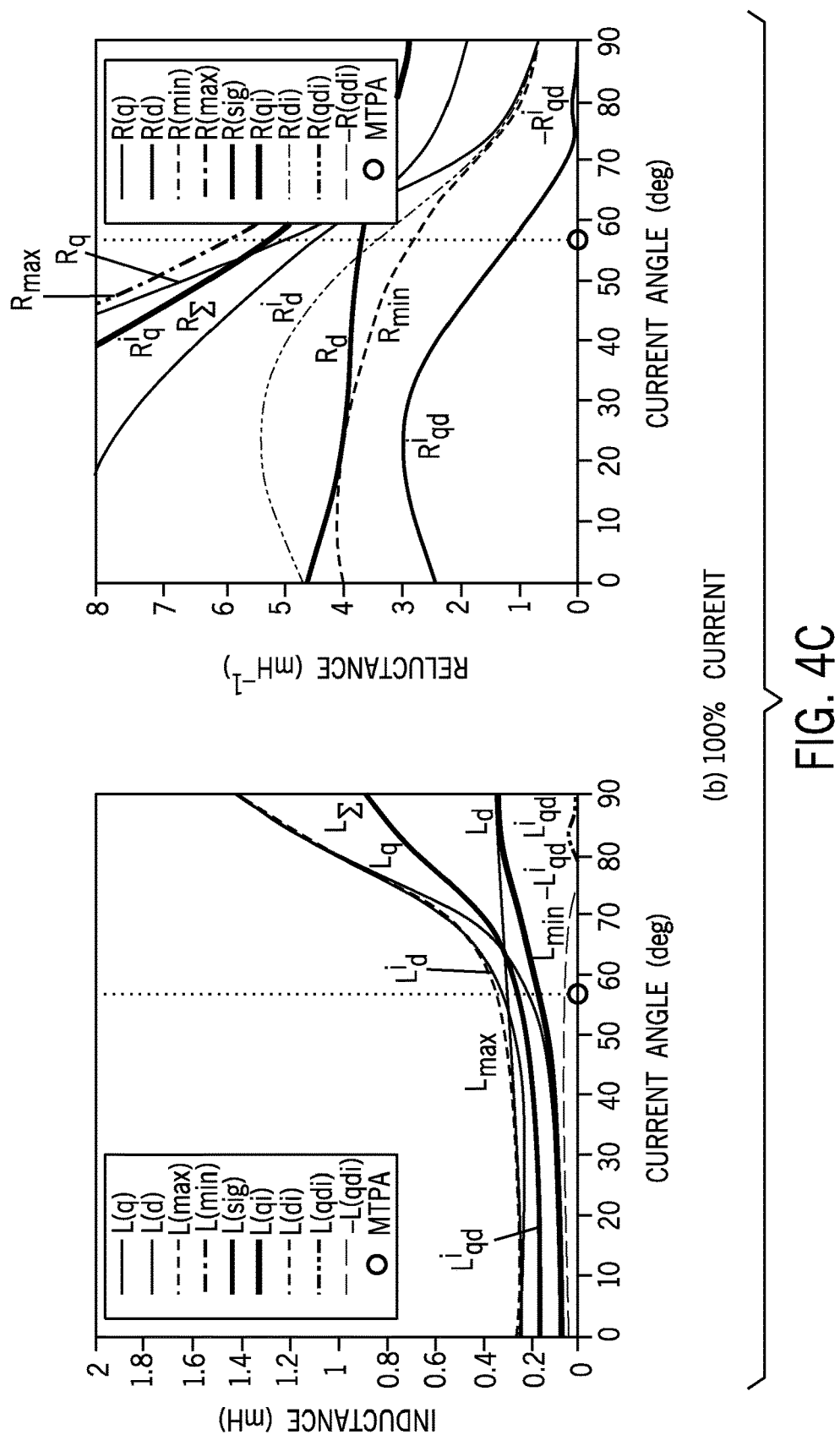

The small signal signatures in the rotor, saliency, and current reference frames described above have sensitivity to magnetic alignment, i.e., to the current angle γ, with FIGS. 4A-4C illustrating these small signal signatures at various current levels for an exemplary IPM motor. The range of current angle in these plots was limited between 0° and 90°. The range covers the typical motoring operating range. The braking operating range will be between 90° and 180° and the signatures will have a mirror image around the 90° point, except for the cross inductance and cross reluctance terms, which will have inverse mirror image. Typically, the current angle γ has strong relationship with torque produced by the electric machine, such that mapping between torque and the signatures can be established as well when torque can be measured or estimated.

As can be seen in FIG. 4A, for no load or very low current operating points, where the desired current vector direction is close to the q-axis, the current frame cross inductance $L^i_{qd}$ (as well as the current frame cross reluctance $R^i_{qd}$) has very good sensitivity while the rest of the signals are not very sensitive.

However, as the current level is increased, the operating point current angle γ deviates from the q-axis and increases towards 90°. As is shown in FIG. 4B, for a 40% current level, rotor frame q axis inductance $L_q$ and rotor frame q axis reluctance $R_q$ show strong and wide sensitivity range around the operating current angle γ. This q-axis variation shows up in the current frame and saliency frame signatures. The current frame d-axis inductance $L^i_d$ and current frame d-axis reluctance $R^i_d$ show good sensitivity range around the operating current angle γ. Rotating vector injection methods can extract saliency frame inductances $L_{min}$, $L_{max}$, and $L_\Sigma$, as well as saliency frame reluctances $R_{max}$, $R_{min}$, and $R_\Sigma$, which can provide even wider sensitivity range if combined together. However, saliency tracking based on pulsating vector injection will have limitations, because it can extract only one signature between $L_{min}$ and $L_{max}$, or between $R_{max}$ and $R_{min}$, such that sensitivity range is significantly limited around the operating point current angle. This is due to the sharp change of signature sensitivity near current angle near 35°, where saliency crosses over from q-axis to d-axis. It should be noted that saliency tracking sensorless operating fails already at 40% current level, due to close proximity to the saliency crossover at the desired operating point.

As shown in FIG. 4C, as the current level is further increased, the saturation of the q-axis gets deeper, leading to stronger and wider sensitivity of the rotor frame q-axis inductance $L_q$ and rotor frame q axis reluctance $R_q$. Sensitivities of the current frame d-axis inductance $L^i_d$ and the current frame d-axis reluctance $R^i_d$ also strengthen significantly. However, as the rotor frame q-axis inductance $L_q$ drops below $L_d$, the sensitivity ranges of the current frame d-axis inductance $L^i_d$ and the current frame d-axis reluctance $R^i_d$ start to reduce near the rotor frame q-axis. To the contrary, sensitivities and ranges of the current frame q-axis inductance $L^i_q$ and the current frame q-axis reluctance $R^i_q$ strengthen significantly. Accordingly, rotating injection would be very effective, since the combination of saliency frame inductances $L_{min}$, $L_{max}$ and $L_\Sigma$ as well as saliency frame reluctances $R_{max}$, $R_{min}$, and $R_\Sigma$, also provide very strong sensitivity and range. Alternatively, while minimum inductance $L_{min}$ or maximum inductance $L_{max}$ tracking pulsating injection both have decent sensitivity, they are not as strong as the previously mentioned signatures.

In summary, as shown in FIG. 4A-4C, the presented magnetic alignment signatures (current frame signatures or saliency frame signatures) combined have strong sensitivity and wide sensitivity range to magnetic alignment over the entire 0~100% current range. This establishes the potential of 100% full torque sensorless operation of the IPM machines using magnetic alignment signatures.

Figure 5A:
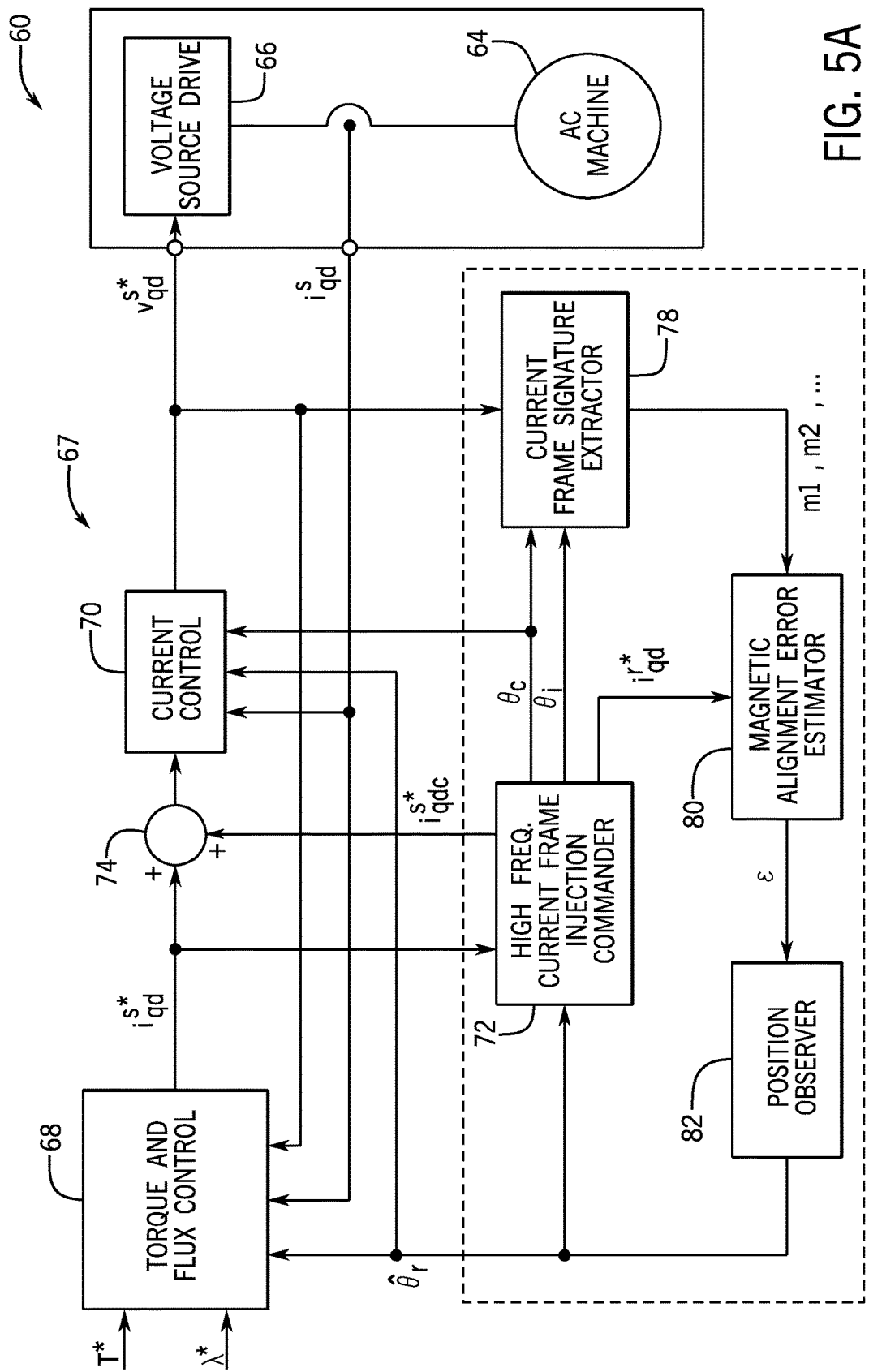
FIG. 5A is a block diagram of a drive system that implements a sensorless control scheme via a high frequency current injection and magnetic alignment signature sensing, according to an embodiment of the invention.
Figure 6A:
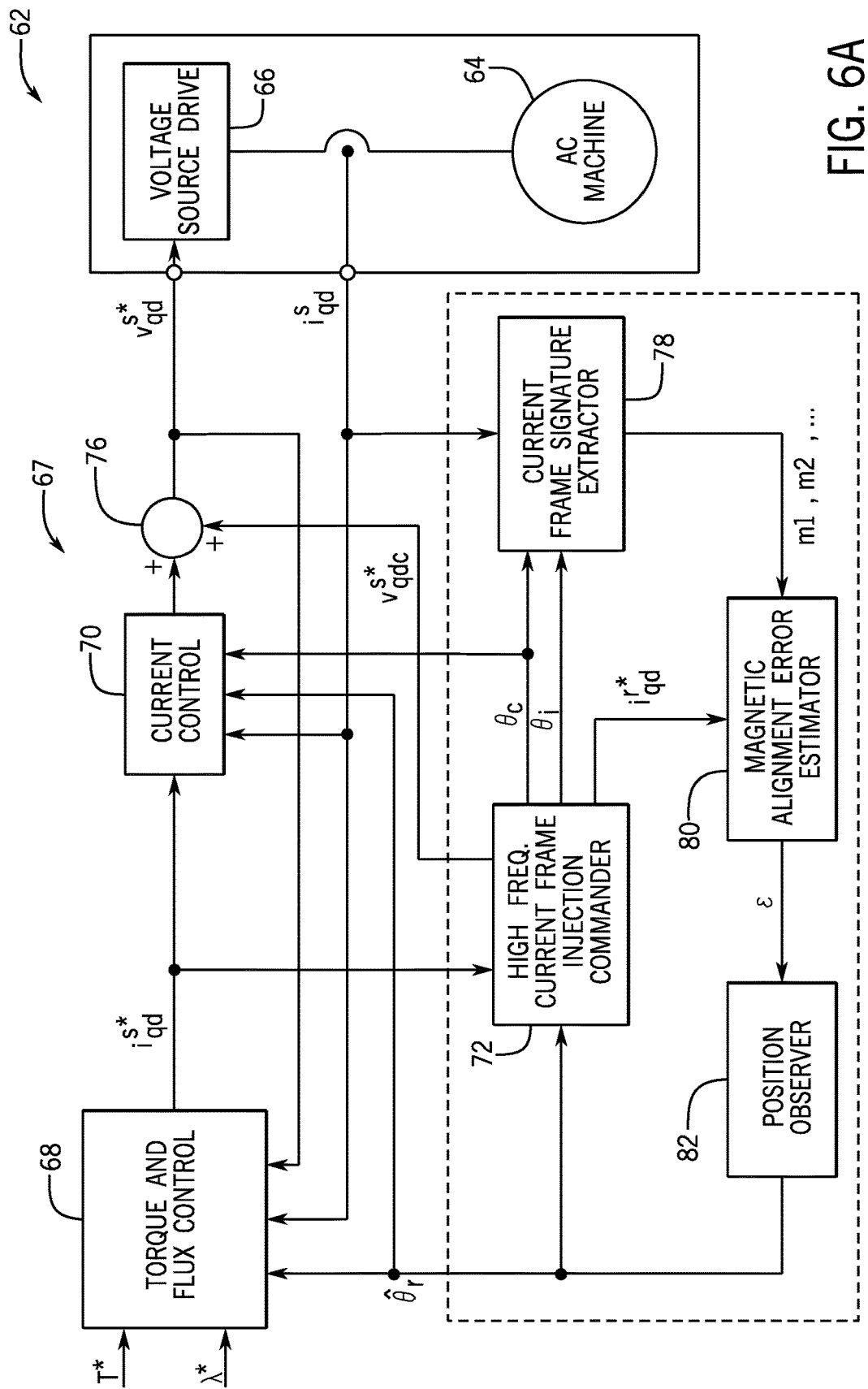
FIG. 6A is a block diagram of a drive system that implements a sensorless control scheme via a high frequency voltage injection and magnetic alignment signature sensing, according to an embodiment of the invention.

Referring now to FIGS. 5A and 6A, block diagrams of drive systems 60, 62 configured to implement a sensorless control technique for controlling operation of an AC electric machine are provided, according to embodiments of the invention. The drive systems 60, 62 provide AC drive power to an AC electric machine 64 composed of a stator and rotor (not shown) using sensorless rotor tracking of the machine, with such sensorless rotor tracking being achieved by measuring one or more of the small signal magnetic alignment signatures described previously above. The drive systems 60, 62 may be implemented with various types of electric machines that are capable of being driven with AC power to provide such sensorless rotor tracking, such as synchronous motors, including synchronous permanent magnet and synchronous reluctance motors, and induction motors. Additionally, the drive systems 60, 62 may provide such sensorless rotor tracking whether the AC electric machine 64 is used as a motor or a generator.

According to embodiments of the invention, the AC electric machine 64 operated by drive system 60, 62 may be any of an interior permanent magnet (IPM) machine, a permanent magnet (PM) assisted synchronous reluctance machine, a synchronous reluctance machine, and an induction machine. Thus, while embodiments of the invention are described and illustrated here after specifically with regard to operation of an IPM machine, it is to be understood that such discussion of these embodiments also extends to other electric machine types and constructions, including PM assisted synchronous reluctance machines, synchronous reluctance machines, and inductance machines as mentioned.

In FIGS. 5A and 6A, embodiments of drive systems 60, 62 are shown in which an electric machine power converter 66 and control system 67 are utilized to drive the AC electric machine 64, with high frequency signal injection and parameter signature tracking being used to determine and track a rotor position of the AC electric machine 64. In one embodiment, and as shown in FIGS. 5A and 6A, electric machine power converter 66 is provided as a voltage source drive, although it is recognized that the electric machine power converter 66 could instead be provided as a current source drive. Voltage source drives 66 for AC machines are well known and may be constructed in various ways, depending on the requirements for driving the electric machine. While control system 67 and the control scheme implemented thereby are shown separately from power converter 66, it is recognized that the control system could be provided either as a controller separate from power converter 66 or as a controller or processor incorporated into power converter 66, according to embodiments of the invention.

As shown in FIGS. 5A and 6A, command signals are provided to the voltage source drive 66 from control system 67, with control system 67 including torque and flux controller 68 and a current controller or regulator 70. System inputs in the control system 67 are torque T* and flux level λ* commands received by the torque and flux controller 68. Responsive to the torque T* and flux level λ* commands, the torque and flux controller 68 outputs a current reference $i_{qd}^{s*}$ to current controller 70, which subsequently outputs commands to voltage source drive 66. Operation of drive system 60, 62 thus results in providing of a primary current excitation (in the form of a current vector having a magnitude and angle) to the AC electric machine 34 to drive the electric machine according to a desired operation.

Also included in the control system 67 is a signal injector 72 that operates to inject high frequency carrier signals to the AC electric machine, with such signals being combined with (i.e., superimposed on) the primary current excitation current vector generated by drive system 60, 62. In the embodiment of FIG. 5A, the signal injector 72 is configured to inject a high frequency current signal onto the current reference $i_{qd}^{s*}$ at adder 74 to create a net current signal or command that is provided to current controller 70. In the embodiment of FIG. 6A, the signal injector 72 is configured to inject a high frequency voltage signal onto the output commands from current controller 70 at adder 76 to create a net signal that is provided to voltage source drive 66.

As shown in FIGS. 5A and 6A, a signature extractor 78, magnetic alignment error estimator 80, and a position observer 82 (collectively, "position estimator") are also included in the control system 67 of drive system 60, 62. Operation of the signature extractor 78, magnetic alignment error estimator 80, and position observer 82 within drive system 60, 62 (along with operation of signal injector 72) provide for position estimation and sensorless control of the electric machine 64, as will be explained in greater detail below.

In operation of motor drive system 60, 62, it is desired to have measurement or estimate of flux $\lambda_{qd}^s$ and torque $T_{em}$ for the control of torque and flux of the electric machine. Typically, if the flux vector $\lambda_{qd}^s$ and current vector $i_{qd}^s$ are measured, torque $T_{em}$ can be estimated based on the following physical relationship:

$$T_{em} = \frac{M}{2}\frac{P}{2}(\lambda_{qd}^s \times i_{qd}^s) = \frac{M}{2}\frac{P}{2}(\lambda_d^s i_q^s - \lambda_q^s i_d^s), \qquad \text{[Eqn. 14]}$$

where M is number of stator phases and P is number of magnetic poles of the electric machine.

When the frequency of AC rotation is high enough, stator flux can be calculated by integrating the terminal voltage $v_{qd}^s$ less the estimated resistive voltage drop $r_s i_{qd}^s$. However, this approach doesn't work well, when the frequency is low. Accordingly, for DC or low frequency operation, flux and torque control often rely on rotor position and current information. Given the knowledge of the electric machine characteristics, knowing the orientation or position of the rotor (or the rotor flux) $\theta_r$, along with the current measurement $i_{qd}^s$ allows estimation of flux. In other words, given the rotor position $\theta_r$, the torque and flux controller can provide a desired current reference $i_{qd}^{s*}$ that achieves the desired flux and torque, based on the prior knowledge of the machine's characteristics. Therefore, it is necessary to have the rotor position information to be able to control an AC electric machine, especially at zero or low frequency operation.

Since a voltage source drive is typically used for electric machine drive systems 60, 62, current control is necessary to achieve the desired current $i_{qd}^{s*}$ at the electric machine. If a current source drive is used, current control may not be necessary. In that case, the motor terminal voltage reference $v_{qd}^{s*}$ is not available, making measurement of motor terminal voltage $v_{qd}^s$ necessary.

For providing sensorless control for electric machine 64, the drive system 60, 62 targets the enabling of position estimation for zero or low frequency operation, by injecting high frequency carrier voltage $v_{qdc}^{s*}$ or current $i_{qdc}^{s*}$ to the electric machine 64 and by extracting key magnetic alignment signatures (previously described) that enable the rotor position estimation. Specific injection methods for injecting the high frequency carrier and measuring/analysis of specific magnetic alignment signatures may be employed by the drive system 60, 62 to extract the magnetic alignment signatures, with preferred injection methods and preferred magnetic alignment signatures that are chosen being dependent on the operating point of the electric machine 64 and on the dynamic state of the machine, so as to improve and maximize the performance of the position estimation.

As shown FIGS. 5A and 6A, a motor terminal voltage reference $v_{qd}^{s*}$ can be used instead of the measured motor terminal voltage $v_{qd}^s$, assuming the voltage error is sufficiently low or can be compensated sufficiently. However, it is recognized that it may be challenging to accurately estimate and compensate the voltage error caused by switching device non-idealities such as propagation delay, non-linear device voltage drop, and dead-time, as well as the variation of DC bus voltage. Therefore, direct measurement of motor terminal voltage $v_{qd}^s$ is often preferred when improvement of voltage accuracy is desired. Similar logic would apply to the use of a motor current measurement in a drive system where a current source drive is used rather than a voltage source drive.

Figure 5B:
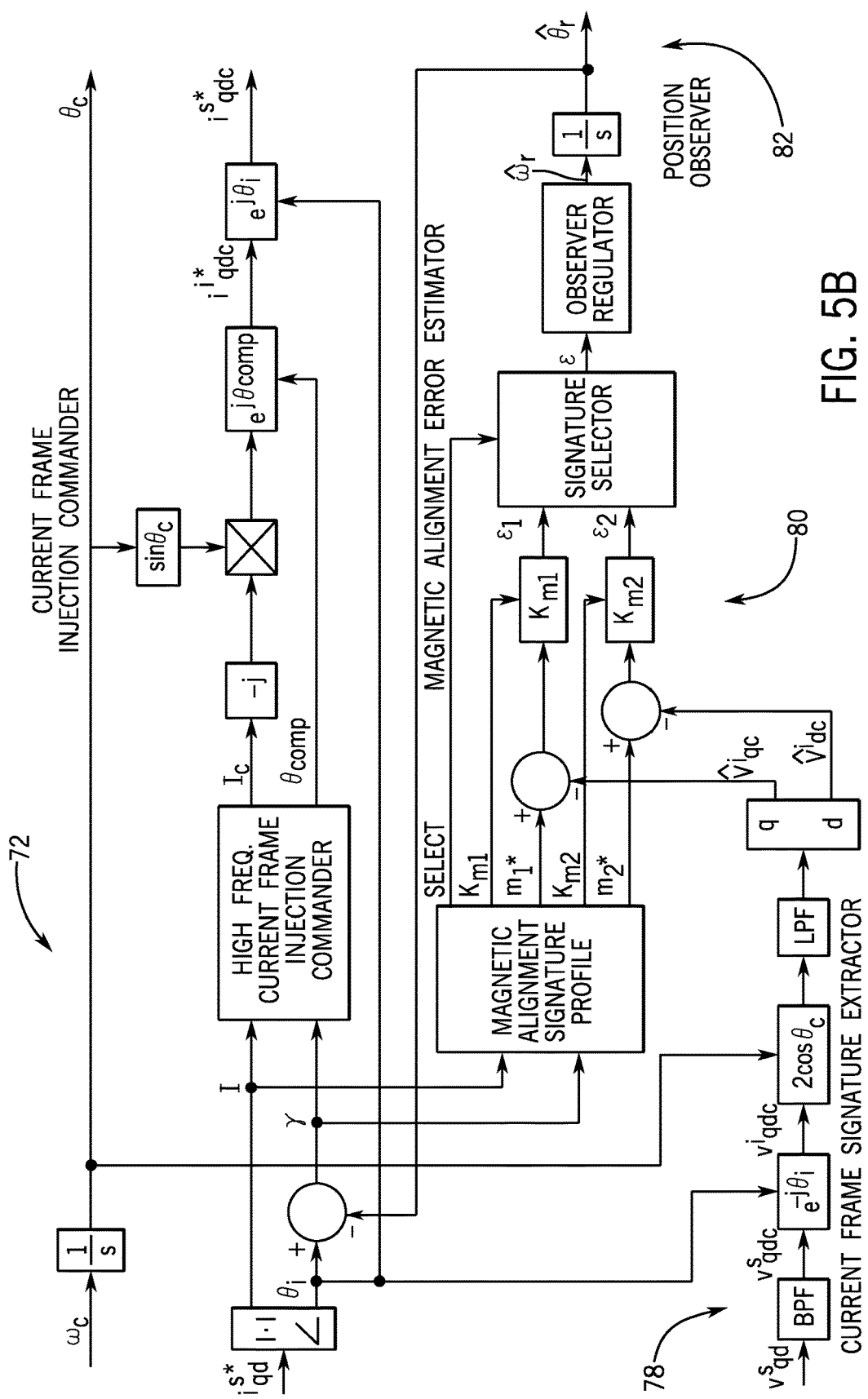
FIG. 5B is a block diagram of the signal injector, signal extractor, magnetic alignment error estimator and position observer in the drive system of FIG. 5A illustrating operations performed by each respective device, according to an embodiment of the invention.
Figure 6B:
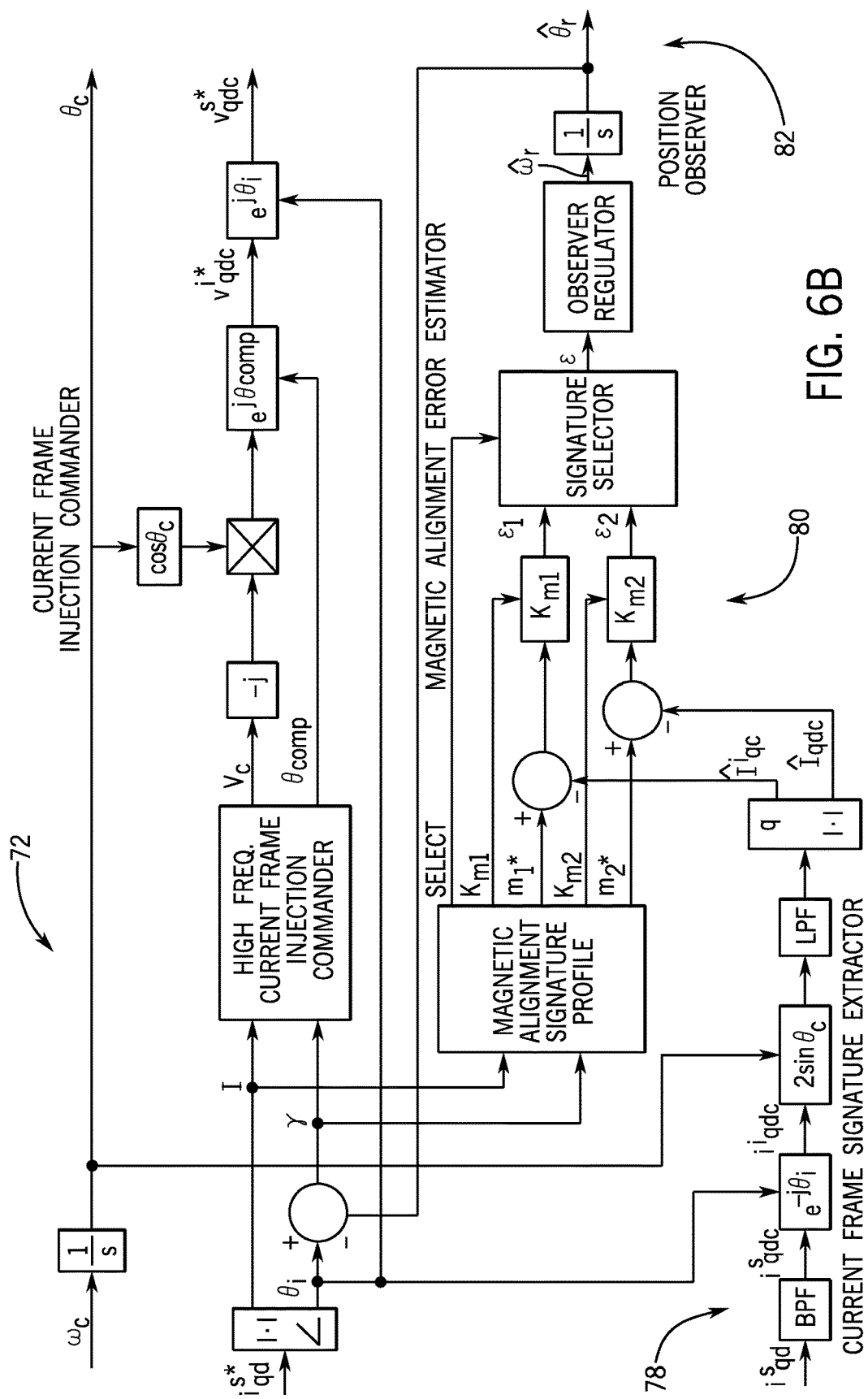
FIG. 6B is a block diagram of the signal injector, signal extractor, magnetic alignment error estimator and position observer in the drive system of FIG. 6A illustrating operations performed by each respective device, according to an embodiment of the invention.

FIGS. 5B and 6B provide a more detailed view of the operations performed by the signal injector 72, signature extractor 78, magnetic alignment error estimator 80, and position observer 82, for embodiments where a high frequency current signal is injected and where a high frequency voltage signal is injected, respectively. The functions of each of the signal injector 72, signature extractor 78, magnetic alignment error estimator 80, and position observer 82 are set forth in greater detail here below.

Figure 7:
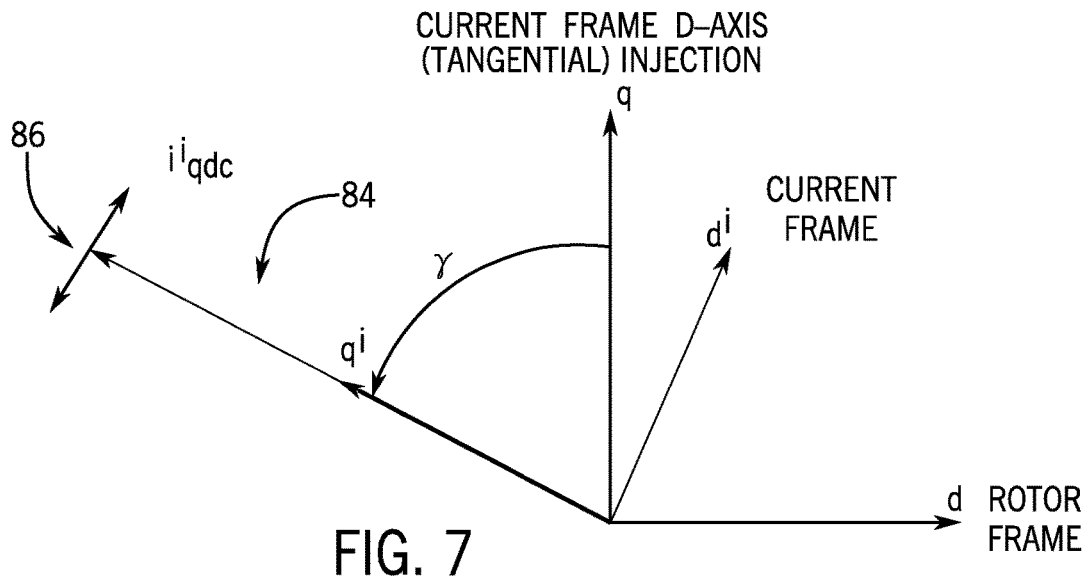
FIG. 7 is a graph illustrating injection of a high frequency signal to a primary excitation current vector on a current reference frame, with the high frequency signal being tangential to the primary current vector, according to an embodiment of the invention.

With regard to the injection of a high frequency injection signal by signal injector 72, injection of such a high frequency signal is illustrated in FIG. 7, according to one embodiment. As shown in FIG. 7, for a desired primary excitation current vector 84 of magnitude I and at an angle γ in the rotor reference frame, a high frequency signal 86 may be injected in a defined current frame (rotated from the rotor frame) that is tangential/orthogonal to the current vector 84. Injecting a high frequency signal 86 orthogonal to the current vector $I^r_{qd}$, i.e., on the current frame d-axis ($d^i$-axis), is advantageous because the torque ripple produced by the high frequency current can be significantly reduced as long as the current angle is maintained near the MTPA (maximum torque per ampere) point. When the injection frequency is in the range of audible frequency, audible noise can also be reduced for the same level of injecting current amplitude.

In an embodiment where the high frequency signal is injected by signal injector 72 as a pulsating high frequency current signal, such as illustrated in the drive system of FIGS. 5A and 5B, the desired injection current $i_{qdc}^i$ can be represented as:

$$i_{qdc}^i = i_{qc}^i - j i_{dc}^i = -j I_c \sin \omega_c t$$

$$i_{qc}^i = 0, i_{dc}^i = I_c \sin \omega_c t \quad \text{[Eqn. 15]},$$

where $I_c$ is the magnitude of the high frequency current and $\omega_c$ is the pulsation frequency of the high frequency current. Here, the pulsation carrier angle $\omega_c t$ can be defined as a carrier angle variable $\theta_c$ and used for both signal injection and for signature extraction as shown in FIG. 5B, and can also be used in the current controller 70 for carrier current injection regulation as shown in FIG. 5A. Using the carrier angle information $\theta_c$, the carrier frame regulator can be implemented to achieve the desired carrier injection current component $i_{qdc}^i$.

Figure 8:
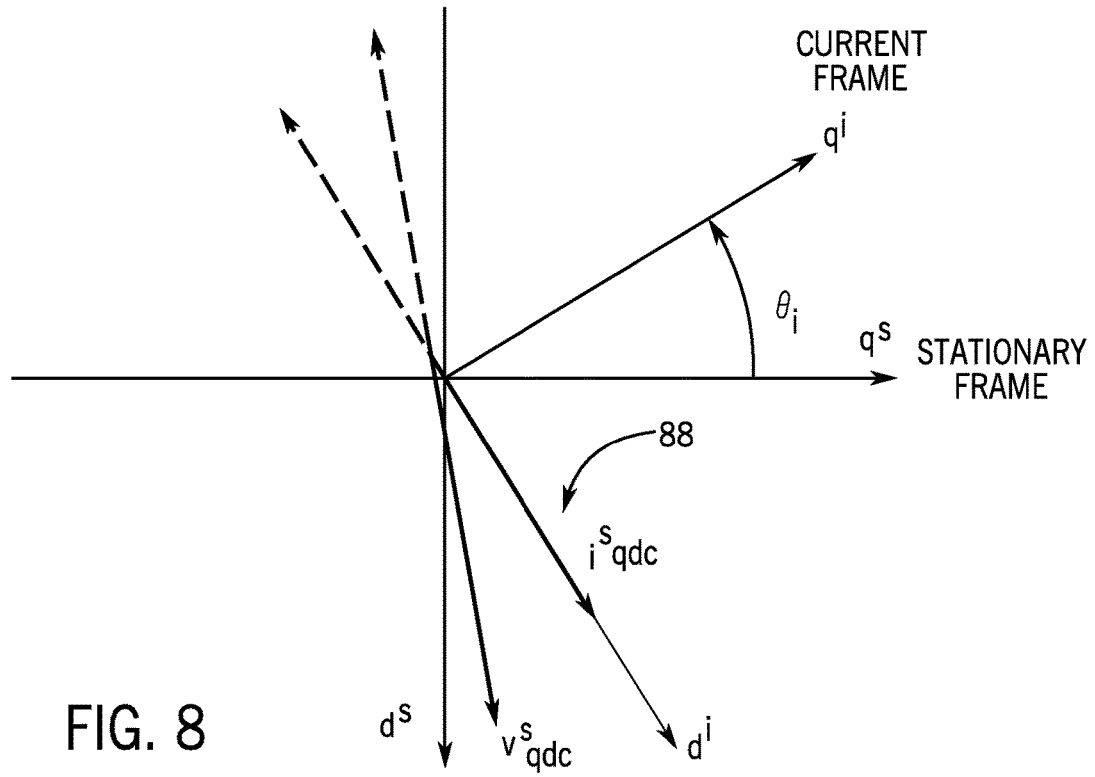
FIG. 8 is a graph illustrating injection of a pulsating, high frequency current signal on the current reference frame, according to an embodiment of the invention.

As illustrated in FIG. 8, in the stationary reference frame, this pulsating vector 88 can be written as $$i_{qdc}^s = -jI_c \sin \omega_c t \, e^{j\theta_i} = I_c \sin \omega_c t(-\sin \theta_i + j \cos \theta_i) \quad \text{[Eqn. 16]},$$

where $\theta_i$ is the angular position of the current vector in reference to the stator q-axis. Illustration of the operations performed and variables applied by the signal injector 72 in Equations [15] and [16] are illustrated in the block diagram of FIG. 5B.

Upon injection of a pulsating high frequency current signal by signal injector 72, and responsive to the current injection, a pulsating voltage vector $v^i_{qdc}$ may be extracted by current frame signature extractor 78 that can be represented as:

$$v_{qdc}^i = v_{qc}^i - j v_{dc}^i = \omega_c (L_{qd}^i - j L_d^i) I_c \cos \omega_c t$$

$$v_{qc}^i = \omega_c L_{qd}^i I_c \cos \omega_c t, v_{dc}^i = \omega_c L_d^i I_c \cos \omega_c t$$

$$V_{qc}^i = \omega_c L_{qd}^i I_c, V_{dc}^i = \omega_c L_d^i I_c$$

$$V_{qdc} = |V_{qc}^i - j V_{dc}^i| = \omega_c I_c |L_{qd}^i - j L_d^i| \quad \text{[Eqn. 17]}.$$

From the measured voltage vector response $v^i_{qdc}$, the current frame d-axis inductance $L^i_d$ and the pulsating frame cross inductance $L^i_{qd}$ can thus be estimated. Also, the entire carrier voltage response magnitude $V_{qdc}$ can be used as a signature as well, where it is a composite signature of both $L^i_d$ and $L^i_{qd}$ as shown in [Eqn. 17].

It is noted that, while the injection current is aligned to the d-axis of the current frame, the voltage response had a q-axis component, which is due to the cross inductance term, $L^i_{qd}$.

With regard to the voltage vector response $v^i_{qdc}$, various methods can be used to extract the pulsating voltage vector components $V_{qc}^i$ and $V_{dc}^i$ from Equation [17]. One simple and effective approach is achieved in Equation [18] by first transforming the voltage signal $v_{qdc}^s$ to the pulsation frame by multiplying by $e^{-j\theta_i}$ and then multiplying with the carrier cos $\theta_c$ to convert the carrier components to DC. Then, low pass filtering can be employed to eliminate the asynchronous components—thereby providing estimates of voltage vector components $\hat{V}_{qc}^i$ and $\hat{V}_{dc}^i$ described according to:

$$\hat{V}_{qc}^i - j\hat{V}_{dc}^i = LPF\{2 \cos \omega_c t \, v_{qdc}^i\} = \quad \text{[Eqn. 18]}$$

$$LPF\{2 \cos \omega_c t \, e^{-j\theta_i} v_{qdc}^s\}$$

$$= LPF\{2 \cos \omega_c t \, \omega_c (L_{qd}^i - j L_d^i) I_c \cos \omega_c t\}$$

$$= \omega_c (L_{qd}^i - j L_d^i) I_c LPF\{2 \cos \omega_c t \cos \omega_c t\}$$

$$= \omega_c (L_{qd}^i - j L_d^i) I_c LPF\{1 + \cos 2\omega_c t\} \approx$$

$$\omega_c (L_{qd}^i - j L_d^i) I_c.$$

While a specific method for extracting the pulsating voltage vector components $V_{qc}^i$, and $V_{dc}^i$ is set forth in Equation [18], it is recognized that other approaches can be used to obtain the high frequency signature. For example, other heterodyning methods, peak detection methods, slope measurement, synchronous frame filtering, or a second order generalized integrator can also be used for extracting the magnetic alignment signatures. Also, according to additional embodiments, the magnetic alignment signatures can be extracted from a different orientation other than the current frame d-axis or the current frame q-axis. If the extraction is performed from a different orientation, the magnetic alignment signature will be a composite signature of both $L_{qd}^i$ and $L_d^i$. For example, the excitation frame d-axis signature can have $(L_{qd}^i \sin \theta_{ex} + L_d^i \cos \theta_{ex})$ and the excitation frame q-axis signature can have $(L_{qd}^i \cos \theta_{ex} + L_d^i \sin \theta_{ex})$, where $\theta_{ex}$ is the angle of the extraction frame relative to the current frame.

Having the current injection carrier selected to be sin $\theta_c$, inductive voltage is extracted using the multiplication of cos $\theta_c$. On the other hand, resistive voltage can also contain magnetic alignment signatures, and a resistive voltage term can be also extracted using a similar extraction method. More specifically, resistive voltage can be extracted by multiplying sin $\theta_c$ to the carrier response.

Illustration of the operations performed and variables applied by the signal extractor 78 in Equations [17] and [18] are illustrated in the block diagram of FIG. 5B.

Figure 9A:
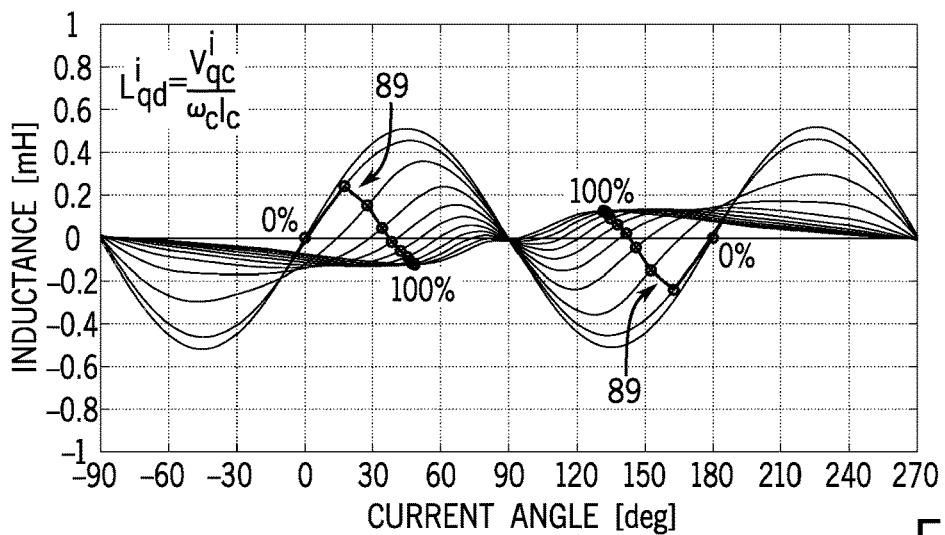
FIGS. 9A-9C are graphs illustrating characteristics of the magnetic alignment signatures resulting from d-axis current injections in the current frame, according to an embodiment of the invention.
Figure 9B:
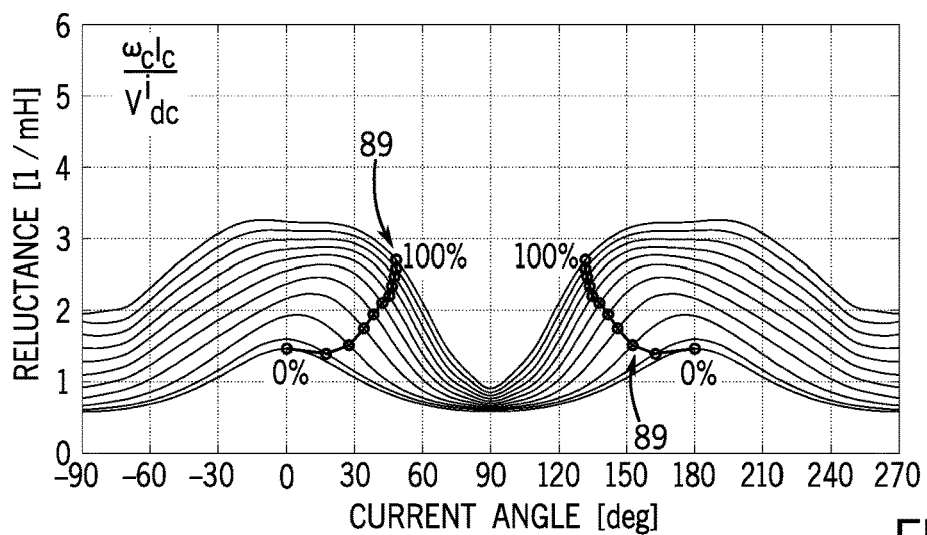
Figure 9C:
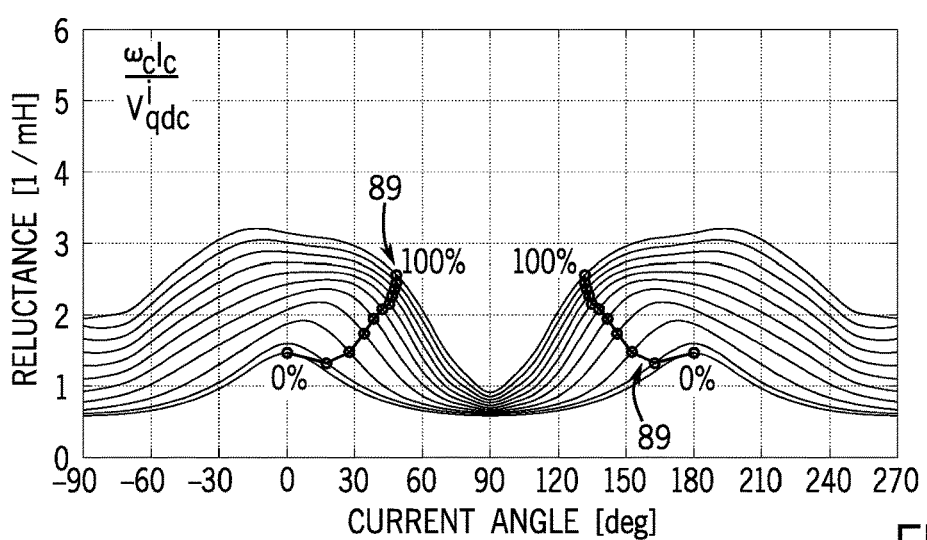

Profiles of the selected magnetic alignment signatures that can be extracted with a current frame d-axis current injection (being derived from Equations [17] and [18]) are illustrated in FIGS. 9A-9C for an exemplary IPM machine. For the extracted pulsating voltage vector components $V_{qc}^i$ and $V_{dc}^i$ and the current frame inductance values $L^i_d$ and $L^i_{qd}$ that are proportional thereto, it is recognized that $V_{qc}^i$ (which is proportional to $L_{qd}^i$) is very sensitive to current angle near 0% current, as illustrated in FIG. 9A, when the motor is operating at the MTPA operation point (MTPA operating line indicated at 89). However, as the current level approaches the range of 20~30%, sensitivity and range of $V_{qc}^i$ drops significantly, such that it is not an ideal magnetic alignment signature to track past this point. Conversely, $V_{dc}^i$, specifically $(\omega_c I_c)/V_{dc}^i$, which is the inverse of $L_d^i$, has strong sensitivity at a current level of 30% and above, as shown in FIG. 9B, such that $(\omega_c I_c)/V_{dc}^i$ can be used as an alternative magnetic alignment signature that may be tracked at current levels of 30% and above with sufficient sensitivity. As another alternative, $(\omega_c I_c)/V_{qdc}^i$ may also be utilized as the magnetic signature, as shown in FIG. 9C.

By combining both signatures $L_{qd}^i$ and $L_d^i$, sensorless control can be achieved. However, the signature level of $1/L_d^i$ at the MTPA operation point is quite close to the maximum signature level. This may limit the dynamic performance of the sensorless control and thus, in order to improve the dynamic performance as well as the sensitivity of the signatures, the current injection orientation can be rotated towards the q-axis of the current frame (qi-axis) for motoring operation and towards the negative q-axis of the current frame for braking operation, when the current level is high enough and when higher dynamic performance is required. This rotation angle $\theta_{comp}$, as provided/indicated in signal injector 72 of FIG. 5A, may be pre-programmed depending on the operating point and operating requirements of the AC electric machine. The rotating angle can also be increased in response to the magnetic alignment signature itself. That is, if the signature level gets close to its limit, the excitation angle can be increased to extend the sensitivity range. This way, the torque pulsation caused by the injection current can be maintained at a low level during steady state operation.

In addition to or alternative to rotating the current injection orientation to extend the sensitivity range of the magnetic alignment signature and improve the dynamic performance, additional design features might be incorporated in the AC electric machine (e.g., IPM motor) that provide further improved signature signal strength and sensitivity, so as to enable full torque control. According to an embodiment of the invention, a component—termed herein as a special rotor structure or "D ring"—may be incorporated into the AC electric machine, with the special rotor structure introducing magnetic saliency for high frequency excitation, wherein this high frequency excitation can be used for sensorless motor control. The special rotor structure may be in the form of any of the rotor structures shown and described in U.S. application Ser. Nos. 14/085,953, 14/019,630 and 13/666,283, incorporated herein by reference, that introduce electrical circuits (shorted circuit, closed circuit with passive or active elements) to a specific orientation of the rotor, so that it couples with the stator winding magnetically. The position of the rotor is measured by injecting the high frequency voltage or current signal to the stator and by measuring the small signal inductance of the rotor. Variation of the alignment of the rotor circuit and the high frequency injection produces a resulting variation of impedance in the electric machine and accompanying inductance.

Figure 10A:
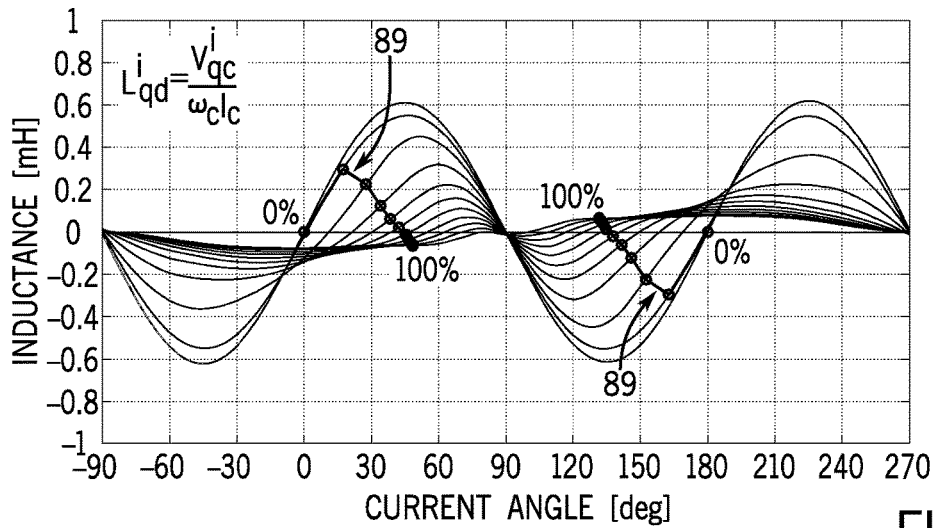
FIGS. 10A-10C are graphs illustrating characteristics of the magnetic alignment signatures resulting from d-axis current injections in the current frame, where a D-ring structure is incorporated into the AC electric machine, according to an embodiment of the invention.
Figure 10B:
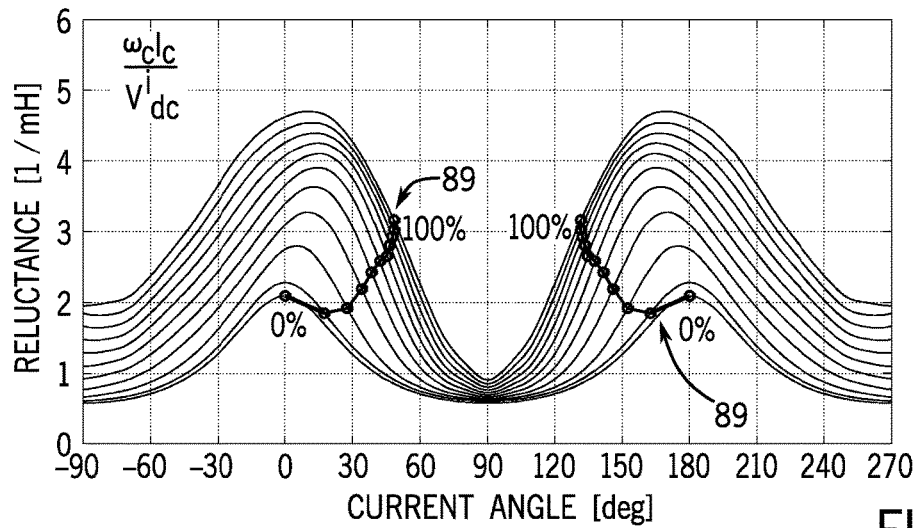
Figure 10C:
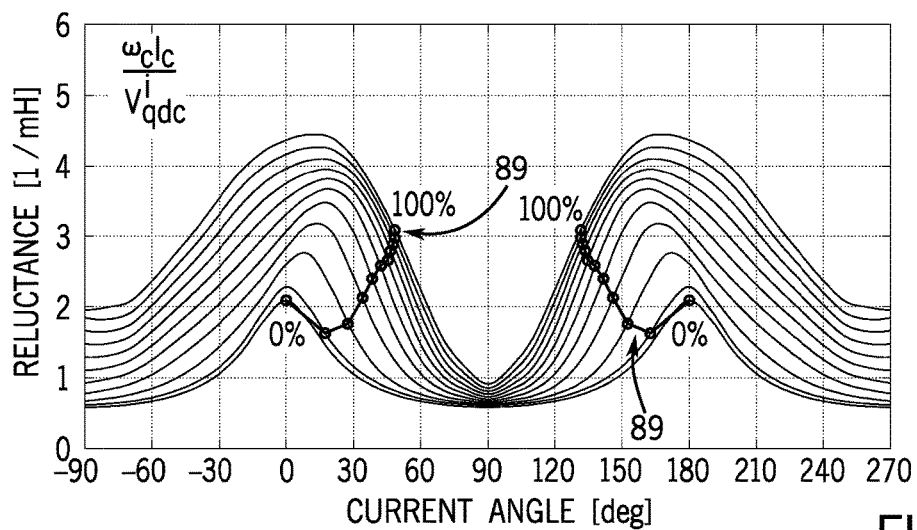

FIGS. 10A-10C illustrate magnetic alignment signature strengths and sensitivities for the signatures $L_{qd}^i$, $1/L_d^i$ (i.e., $(\omega_c I_c)/V_{dc}^i$), and $(\omega_c I_c)/V_{qdc}^i$ in an embodiment where a D-ring is incorporated into the AC electric machine. As can be seen by comparing the magnetic alignment signatures in FIGS. 9A-9C to the magnetic alignment signatures in FIGS. 10A-10C, inclusion of a D-ring structure serves to provide improved signature signal strength and extend the sensitivity range of the magnetic alignment signature, so as to enable full torque sensorless control of the electric machine.

Another embodiment of the invention provides for high frequency signal injection in the form of a pulsating high frequency current signal with a variable injection angle. That is, the injection current angle can be adjusted by a compensation angle $\theta_{comp}$ in order to achieve a desired signature sensitivity, with the adjustment angle being described by:

$$i_{qdc}^i = i_{qc}^i - ji_{dc}^i = -jI_c \sin \omega_c t \; e^{j\theta_{comp}}$$

$$v_{qc}^i = I_c \sin \omega_c t \sin \theta_{comp}, v_{dc}^i = I_c \sin \omega_c t \cos \theta_{comp} \quad \text{[Eqn. 19]}.$$

This injection is equivalent to a d-axis current injection of the pulsation frame, with the d-axis of the pulsation aligned on the angular position $(\theta_i + \theta_{comp})$. So the signature can be defined using the inductances in the pulsating frame as $L_{qd}^p$ and $L_d^p$ in the same manner by which the current frame signatures are derived in [Eqn. 17].

The signature extraction can be done in any frame and the orientation can be selected to improve the signature sensitivity. For example, if the current frame is used as the extraction frame, the adjustment of the injection current angle effectively produces a carrier voltage response according to:

$$v_{qdc}^i = v_{qc}^i - jv_{dc}^i = \omega_c I_c \begin{bmatrix} L_q^i & L_{qd}^i \\ L_{dq}^i & L_d^i \end{bmatrix} \begin{Bmatrix} \sin \theta_{comp} \\ \cos \theta_{comp} \end{Bmatrix} \cos \omega_c t \quad \text{[Eqn. 20]}$$

$$v_{qc}^i = \omega_c I_c \{L_q^i \sin \theta_{comp} + L_{qd}^i \cos \theta_{comp}\} \cos \omega_c t$$

$$v_{dc}^i = \omega_c I_c \{L_{dq}^i \sin \theta_{comp} + L_d^i \cos \theta_{comp}\} \cos \omega_c t$$

$$V_{qc}^i = \omega_c I_c \{L_q^i \sin \theta_{comp} + L_{qd}^i \cos \theta_{comp}\}$$

$$V_{dc}^i = \omega_c I_c \{L_{dq}^i \sin \theta_{comp} + L_d^i \cos \theta_{comp}\}.$$

At one extreme of this injection angle variation, the injection angle is 90° where current injection aligns with current frame q-axis. For such an injection angle variation, torque pulsation would be significantly increased, but the signal sensitivity would be greatly improved.

In an embodiment where the high frequency signal is injected by signal injector 72 as a pulsating high frequency voltage signal, such as illustrated in the drive system of FIGS. 6A and 6B, the desired injection voltage $v_{qdc}^i$ can be represented as:

$$v_{qdc}^i = v_{qc}^i - jv_{dc}^i = -jV_c \cos \omega_c t$$

$$v_{qc}^i = 0, v_{dc}^i = V_c \cos \omega_c t \quad \text{[Eqn. 21]},$$

where $V_c$ is the magnitude of the high frequency voltage and $\omega_c$ is the pulsation frequency.

Here, the pulsation carrier angle $\omega_c t$ can be defined as a carrier angle variable $\theta_c$ and used for both signal injection and for signature extraction as shown in FIG. 6B, and can also be used in the current controller to support the carrier voltage current injection regulation as shown in FIG. 6A. Especially when the voltage injection carrier frequency doesn't have sufficient spectral separation from the current regulation bandwidth, current regulator is desired not to attenuate the injection voltage by creating a cancelling control effort for disturbance rejection. An injection voltage regulator can also be implemented, using the carrier angle $\theta_c$.

Figure 11:
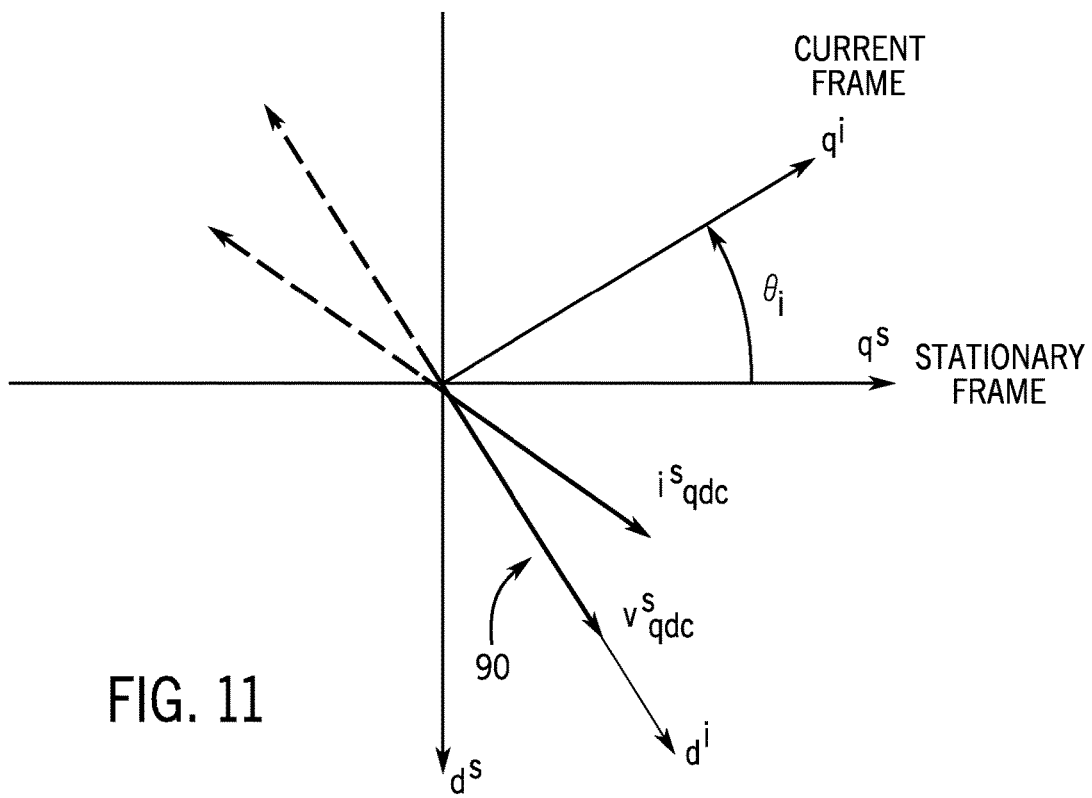
FIG. 11 is a graph illustrating injection of a pulsating, high frequency voltage signal on the current reference frame, according to an embodiment of the invention.

As illustrated in FIG. 11, in the stationary reference frame, this pulsating vector 90 can be written as $$v_{qdc}^s = -jV_c \cos \omega_c t \; e^{j\theta_i} = V_c \cos \omega_c t (-\sin \theta_i + j \cos \theta_i) \quad \text{[Eqn. 22]},$$

where $\theta_i$ is the angular position of the current vector in reference to the stator q-axis. Illustration of the operations performed and variables applied by the signal injector 72 in Equations [19] and [20] are illustrated in the block diagram of FIG. 6B.

Upon injection of a pulsating high frequency voltage signal by signal injector 72, a carrier current response can be derived according to:

$$i^i_{qdc} = i^i_{qc} - ji^i_{dc} = \frac{V_c}{\omega_c}(\mathcal{R}^i_{qd} - j\mathcal{R}^i_d)\sin\omega_c t \quad \text{[Eqn. 23]}$$

$$i^i_{qc} = \frac{V_c}{\omega_c}\mathcal{R}^i_{qd}\sin\omega_c t, \quad i^i_{dc} = \frac{V_c}{\omega_c}\mathcal{R}^i_d \sin\omega_c t$$

$$I^i_{qc} = \frac{V_c}{\omega_c}\mathcal{R}^i_{qd}, \quad I^i_{dc} = \frac{V_c}{\omega_c}\mathcal{R}^i_d$$

$$I_{qdc} = |I^i_{qc} - jI^i_{dc}| = \frac{V_c}{\omega_c}|\mathcal{R}^i_{qd} - j\mathcal{R}^i_d|.$$

From the measured carrier current response $i^i_{qdc}$, the current frame d-axis reluctance $\mathcal{R}^i_d$ and the pulsating frame cross reluctance $\mathcal{R}^i_{qd}$ can be estimated.

It is noted that, while the injection voltage is aligned to the d-axis of the current frame, the carrier current response had a q-axis component, which is due to the cross inductance term. This can increase the torque pulsation during MTPA operation.

With regard to the current carrier response $i^i_{qdc}$, various methods can be used to extract the pulsating current vector components $I^i_{qc}$ and $I^i_{dc}$. One simple and effective approach is achieved in Equation [22] by first transforming the current signal $i^i_{qdc}$ to the pulsation frame by multiplying by $e^{-j\theta_i}$ and then multiplying with the carrier $\sin\theta_c$ to convert the carrier components to DC. Then, low pass filtering can eliminate the asynchronous components, providing estimates of current vector components $\hat{I}^p_{qc}$ and $\hat{I}^p_{dc}$ as described according to:

$$\hat{I}^i_{qc} - j\hat{I}^i_{dc} = LPF\{2\sin\omega_c t\, i^i_{qdc}\} = LPF\{2\sin\omega_c t\, e^{-j\theta_i} i^s_{qdc}\}$$

$$= LPF\left\{2\sin\omega_c t \frac{V_c}{\omega_c}(\mathcal{R}^i_{qd} - j\mathcal{R}^i_d)\sin\omega_c t\right\}$$

$$= \frac{V_c}{\omega_c}(\mathcal{R}^i_{qd} - j\mathcal{R}^i_d)LPF\{2\sin\omega_c t \sin\omega_c t\}$$

$$= \frac{V_c}{\omega_c}(\mathcal{R}^i_{qd} - j\mathcal{R}^i_d)LPF\{1 - \cos 2\omega_c t\} \approx \frac{V_c}{\omega_c}(\mathcal{R}^i_{qd} - j\mathcal{R}^i_d)$$

[Eqn. 24].

Illustration of the operations performed and variables applied by the signal extractor 78 in Equations [21] and [22] are illustrated in the block diagram of FIG. 6B.

Figure 12A:
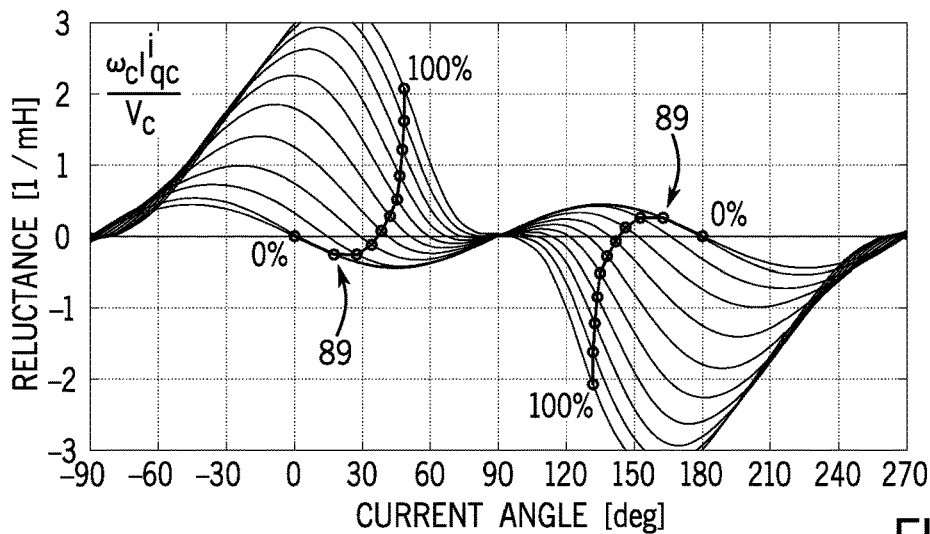
FIGS. 12A-12C are graphs illustrating Characteristics of the Current Frame d-axis Voltage Injection Signatures of an IPM machine, according to an embodiment of the invention.
Figure 12B:
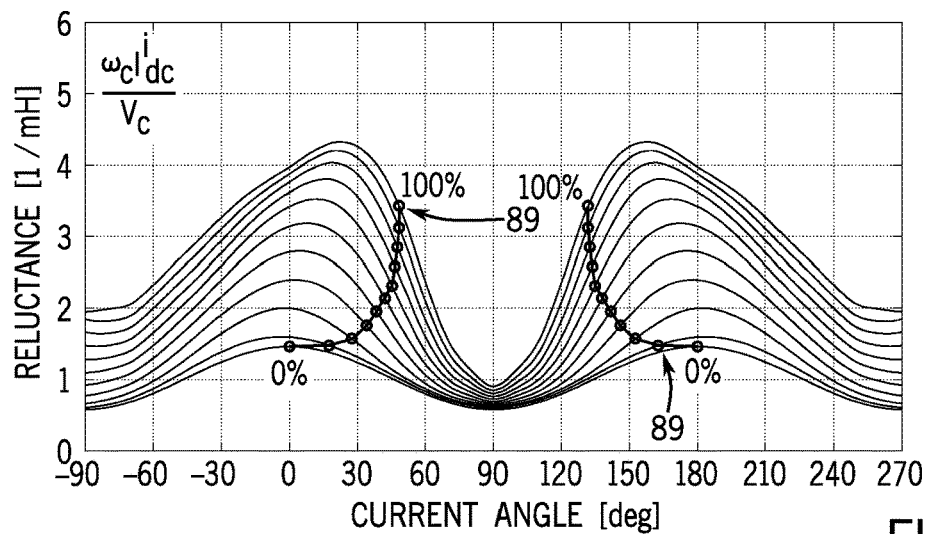
Figure 12C:
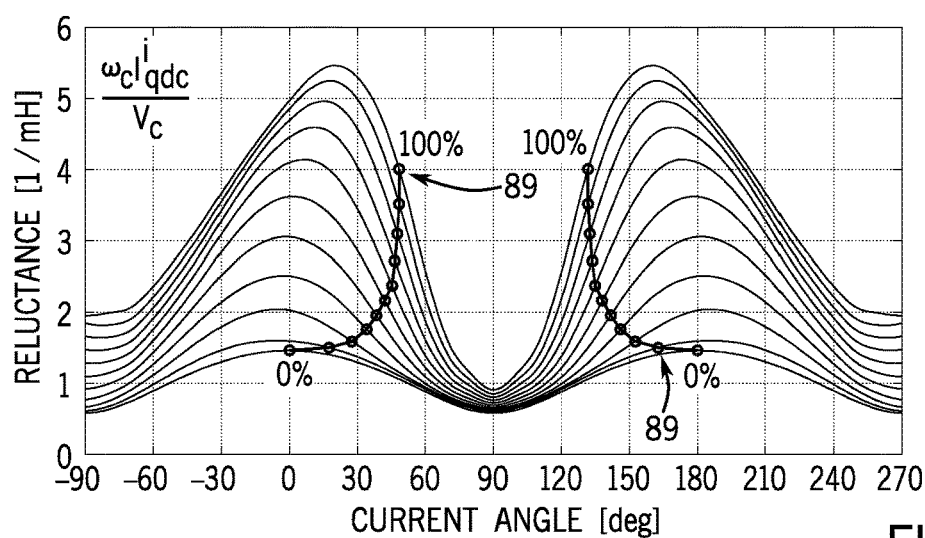

Profiles of the selected magnetic alignment signatures that can be extracted with a current frame d-axis voltage injection (being derived from Equations [23] and [24]) are illustrated in FIGS. 12A-12C for an exemplary IPM machine. For the current frame d-axis voltage injection, unlike the current injection, current frame q-axis carrier current component $I^i_{qc}$ deviates from zero at MTPA points due to the cross reluctance term $\mathcal{R}^i_{qd}$ and its sensitivity to q-axis saturation and cross saturation effect, with it being seen in FIG. 12A that, near zero current level, where the di-axis current component $I^i_{dc}$ doesn't have sensitivity, the qi-axis component $I^i_{qc}$ provides good sensitivity. Also, for higher current level, the sensitivity range of $I^i_{qc}$ is extended significantly around MTPA points. As shown in FIG. 12B, for medium current level, 20~50% in this example, sensitivity of $I^i_{qc}$ has limited range, so use of $I^i_{dc}$ component would be preferred. As shown in FIG. 12C, except for the zero and low current levels, use of carrier current component magnitude $I^i_{qdc}$ is a good magnetic alignment signature option because it combines the strength of both qi-axis and di-axis carrier current components nicely.

Figure 13:
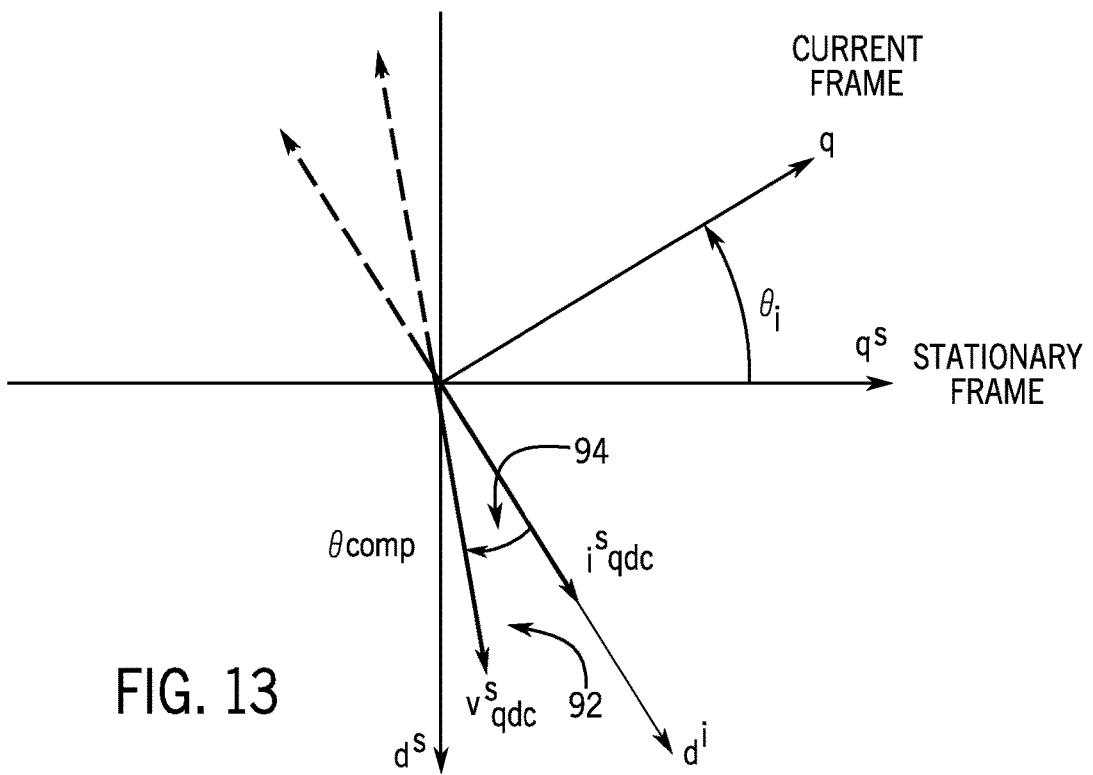
FIG. 13 is a graph illustrating injection of a pulsating, high frequency, phase compensated current signal on a current reference frame, according to an embodiment of the invention.

Another embodiment of the invention provides for high frequency signal injection in the form of a pulsating high frequency voltage signal with angle compensation, as illustrated in FIG. 13. That is, the injection voltage angle of pulsating vector 92 can be adjusted by a compensation angle $\theta_{comp}$ 94 according to:

$$v^i_{qdc} = v^i_{qc} - jv^i_{dc} = -jV_c \cos\omega_c t\, e^{j\theta_{comp}}$$

$$v^i_{qc} = V_c \cos\omega_c t \sin\theta_{comp},\, v^i_{dc} = V_c \cos\omega_c t \cos\theta_{comp} \quad \text{[Eqn. 25]}.$$

The adjustment of the injection voltage angle effectively produces a current injection tangential to the main current vector according to:

$$\theta_{comp} = -\tan^{-1}\left(\frac{L^i_{qd}}{L^i_d}\right). \quad \text{[Eqn. 26]}$$

Beneficially, adjustment of the injection voltage angle by a compensation angle $\theta_{comp}$ results in reduced torque pulsation.

This adjusted angle injection is equivalent to a d-axis voltage injection of the pulsation frame with d-axis of the pulsation aligned on the angular position $(\theta_i + \theta_{comp})$. So the signature can be defined using the reluctance in the pulsating frame as $R^p_{qd}$ and $R^p_d$ in the same manner current by which frame signatures are derived in [Eqn. 24]. The signature extraction can be done in any frame and the orientation can be selected to improve the signature sensitivity. For example, if the current frame is used as the extraction frame, the carrier current response can be derived as:

$$i^i_{qdc} = i^i_{qc} - ji^i_{dc} = \frac{V_c}{\omega_c}\begin{bmatrix}\mathcal{R}^i_q & \mathcal{R}^i_{qd}\\ \mathcal{R}^i_{dq} & \mathcal{R}^i_d\end{bmatrix}\begin{Bmatrix}\sin\theta_{comp}\\ \cos\theta_{comp}\end{Bmatrix}\sin\omega_c t \quad \text{[Eqn. 27]}$$

$$i^i_{qc} = \frac{V_c}{\omega_c}\{\mathcal{R}^i_q \sin\theta_{comp} + \mathcal{R}^i_{qd}\cos\theta_{comp}\}\sin\omega_c t$$

$$i^i_{dc} = \frac{V_c}{\omega_c}\{\mathcal{R}^i_{dq}\sin\theta_{comp} + \mathcal{R}^i_d \cos\theta_{comp}\}\sin\omega_c t$$

$$I^i_{qc} = \frac{V_c}{\omega_c}\{\mathcal{R}^i_q \sin\theta_{comp} + \mathcal{R}^i_{qd}\cos\theta_{comp}\}$$

$$I^i_{dc} = \frac{V_c}{\omega_c}\{\mathcal{R}^i_{dq}\sin\theta_{comp} + \mathcal{R}^i_d\cos\theta_{comp}\}$$

$$I_{qdc} = |I^i_{qc} - jI^i_{dc}| =$$

$$\frac{V_c}{\omega_c}|(\mathcal{R}^i_q - j\mathcal{R}^i_{dq})\sin\theta_{comp} + (\mathcal{R}^i_{qd} - j\mathcal{R}^i_q)\cos\theta_{comp}|$$

Figure 14A:
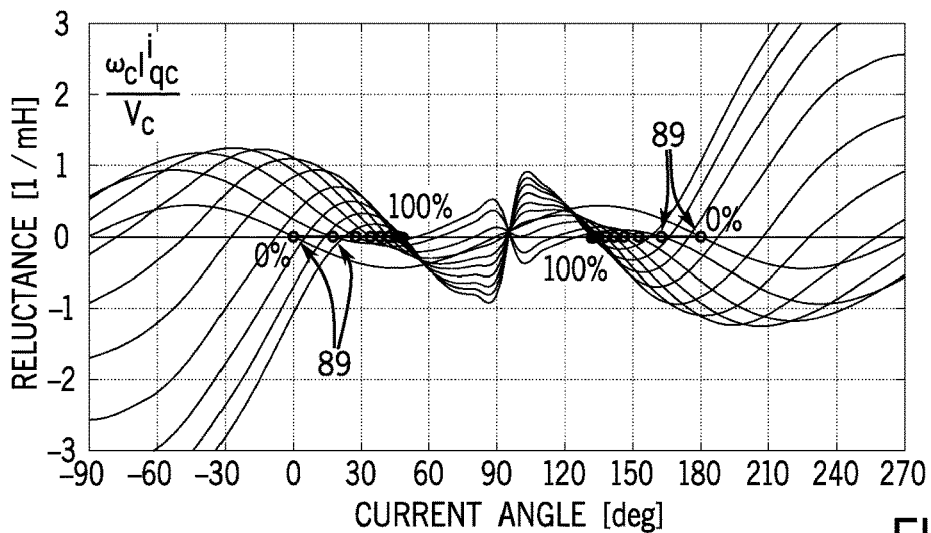
FIGS. 14A-14C are graphs illustrating Characteristics of the Angle Compensated Current Frame Voltage Injection Signatures of an IPM machine with Carrier Current aligned on di-axis at MTPA points, according to an embodiment of the invention.
Figure 14B:
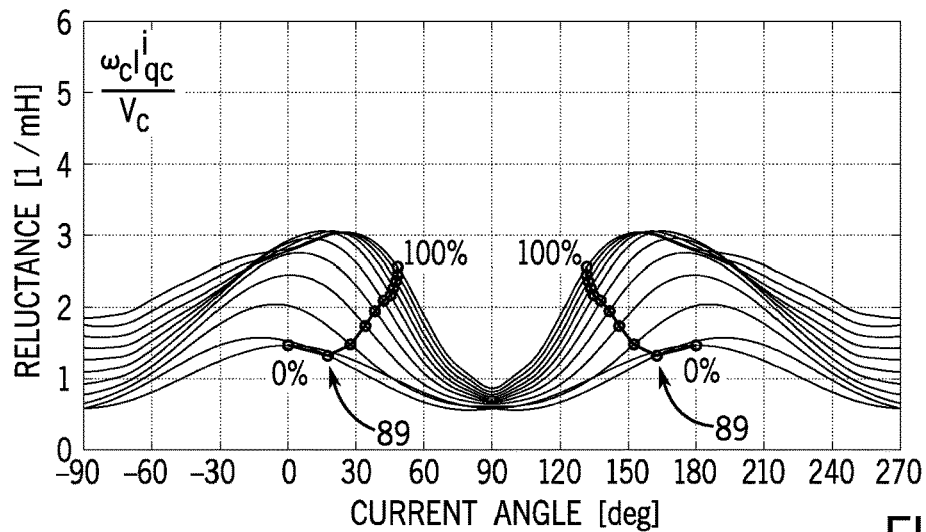
Figure 14C:
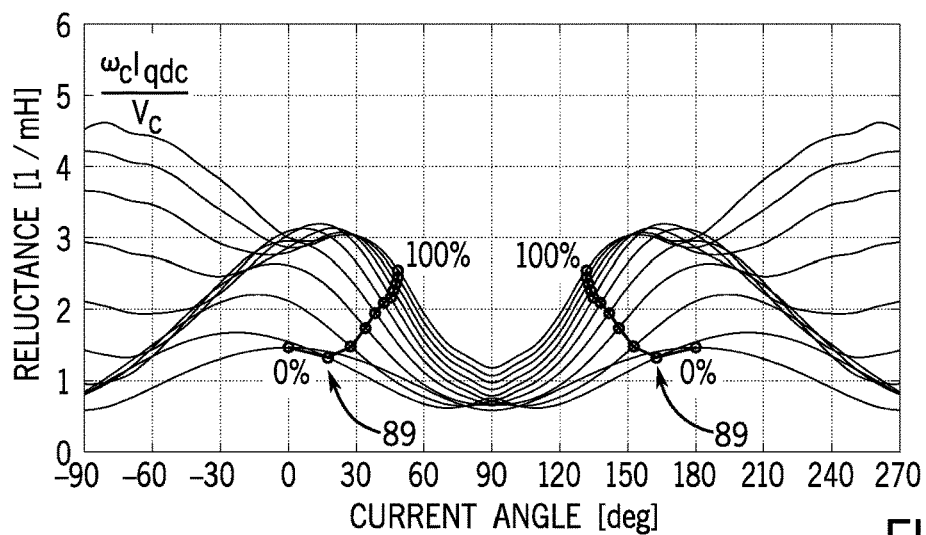

As illustrated in FIGS. 14A-14C, the voltage compensation angle $\theta_{comp}$ may be profiled to produce minimum torque pulsation at the MTPA operation. Therefore, the qi-axis carrier current component $I^i_{qc}$ is zero for all the MTPA operating points 89, as shown in FIG. 14A. However, as shown in FIGS. 14B and 14C, sensitivity of the reluctance signature and $(\omega_c I^i_{qc})/V_c$ and $(\omega_c I_{qdc})/V_c$ is significantly reduced, with it being recognized that torque pulsation can be allowed to increase by increasing the qi-axis current, in order to improve the sensitivity of the signatures.

Figure 15A:
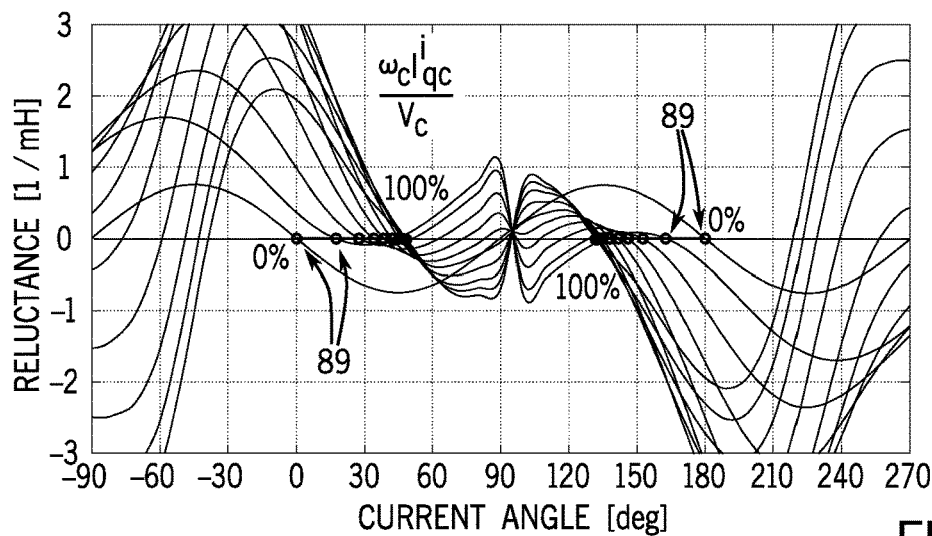
FIGS. 15A-15C are graphs illustrating Characteristics of the Angle Compensated Current Frame Voltage Injection Signatures of an IPM machine with D-ring structure with Carrier Current aligned on di-axis at MTPA points, according to an embodiment of the invention.
Figure 15B:
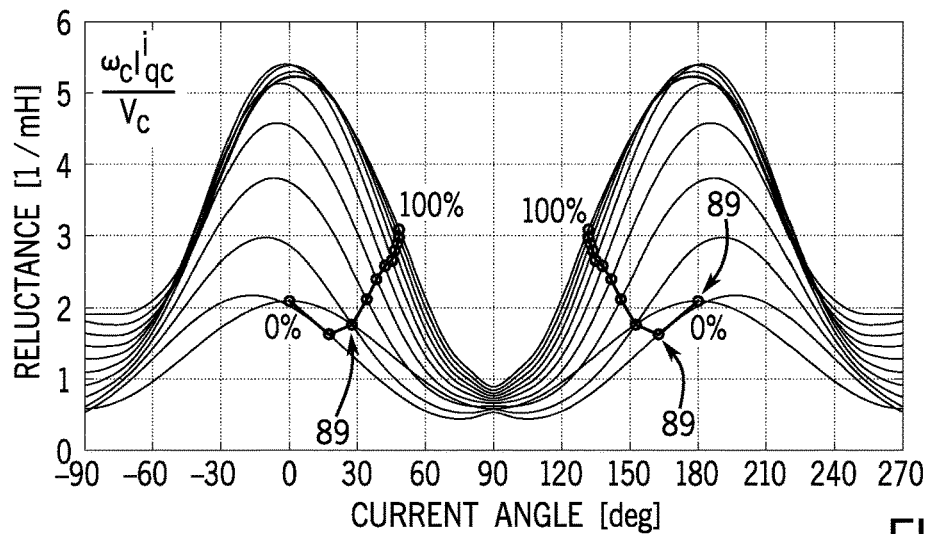
Figure 15C:
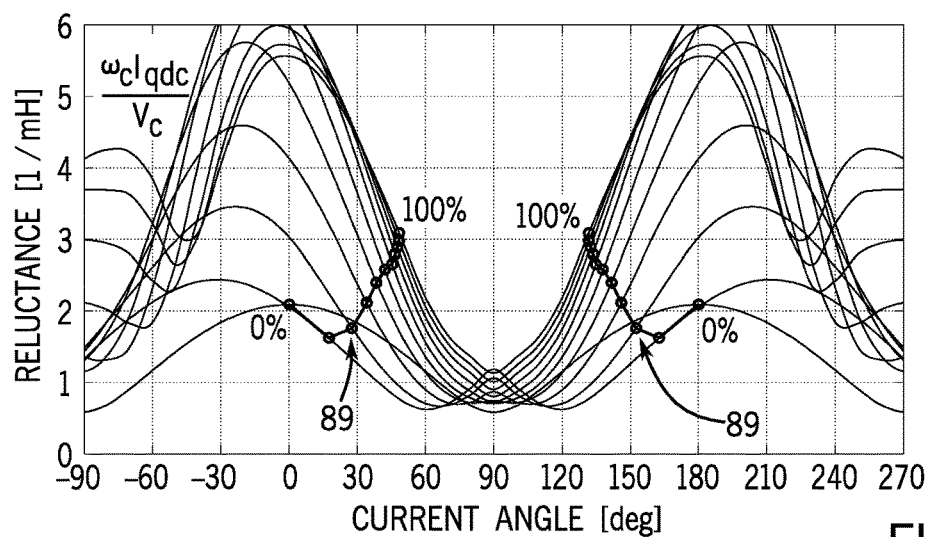

As previously indicated, inclusion of a D-ring structure in the AC electric machine serves to provide improved signature signal strength and extend the sensitivity range of the magnetic alignment signature, so as to enable full torque sensorless control of the electric machine. FIGS. 15A-15C illustrate magnetic alignment signature strengths and sensitivities for the qi-axis carrier current component $I^i_{qc}$ and reluctance signature $(\omega_c I_{qc}{}^i)/V_c$ and $(\omega_c I_{qdc}{}^i)/V_c$, with it being seen in comparison to FIGS. 14A-14C that the signature sensitivity and sensitivity range can be improved/extended, even though the angle compensation is used to achieve minimum torque pulsation at MTPA points 89.

It can therefore be seen that extraction of a magnetic alignment signature is enabled based on injection of a high frequency carrier signal onto the primary excitation current. As can be seen from Equations [17]-[18] and [21]-[22] above, the signature derived is dependent on the high frequency injection method employed—with it being recognized that, for example, d-axis inductance or reluctance in the current frame, $L^i_d$, $R^i_d$, may be measured as the signature. The extracted signature may thus generally be designated as a magnetic alignment signature m.

Figure 16A:
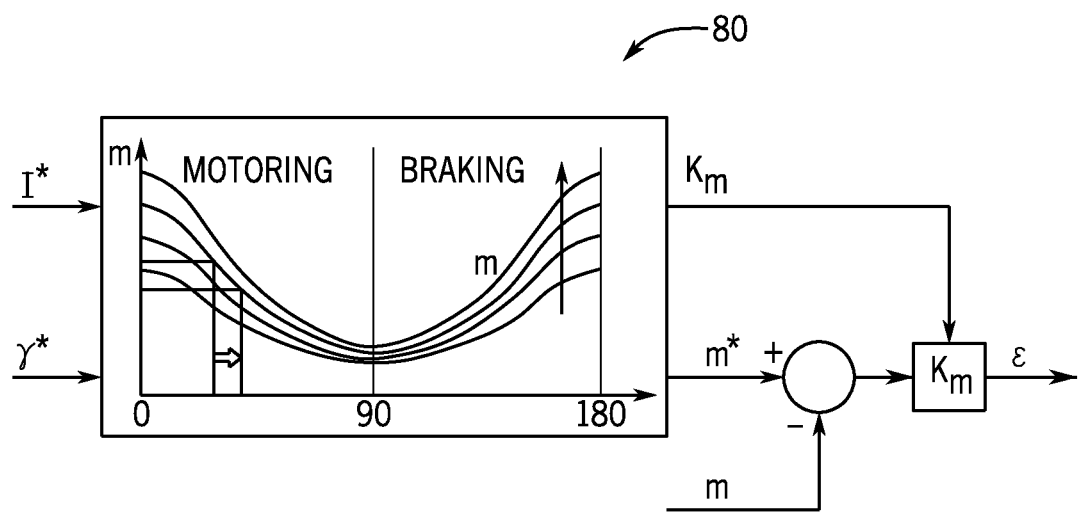
FIG. 16A is a block diagram of a magnetic alignment error estimation using a forward mapping technique, implemented by the magnetic alignment error estimator of FIGS. 5B and 6B, according to an embodiment of the invention.

As seen in each of FIGS. 7B and 8B and now also in FIG. 16A, upon extraction of a desired magnetic alignment signature, the signature value is provided to magnetic alignment error estimator 80 (along with the operating point $(I,\gamma)$)—with the magnetic alignment signature being indicated as voltage vector components $\hat{V}_{qc}{}^i$ and $\hat{V}_{dc}{}^i$, in FIG. 7B (allowing for estimation of the current frame d-axis inductance $L^i_d$ and the pulsating frame cross inductance $L^i_{qd}$), as current vector components $\hat{I}_{qc}{}^p$ and $\hat{I}_{dc}{}^p$ in FIG. 8B (allowing for estimation of the current frame d-axis reluctance $R^i_d$ and the pulsating frame cross reluctance $R^i_{qd}$), and generally as m in FIG. 16A. Via magnetic alignment error estimator 80, the characteristics of the selected magnetic alignment signature m can be used to estimate a magnetic alignment error $\varepsilon$.

Figure 17:
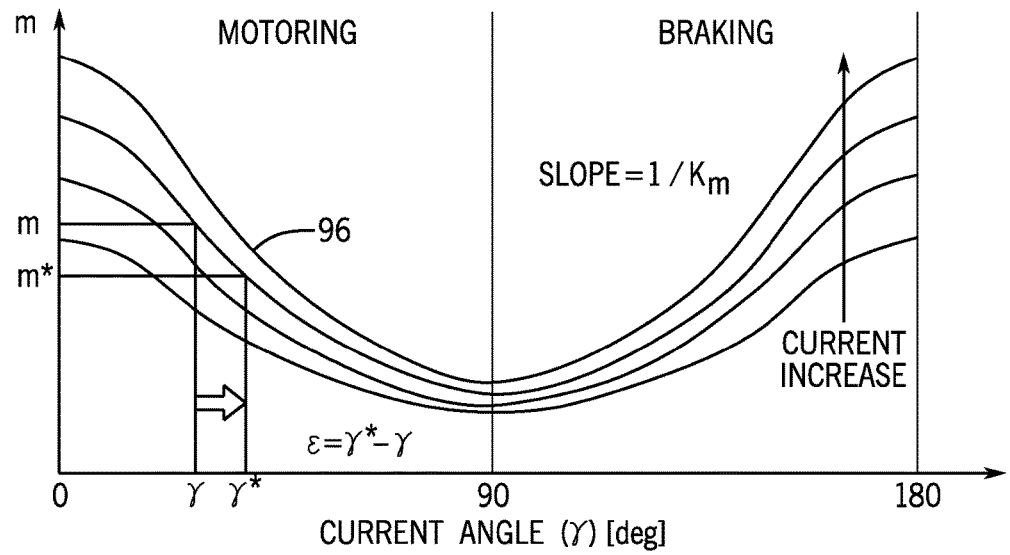
FIG. 17 is a graph illustrating estimation of a magnetic alignment error from the magnetic alignment signature using a forward mapping technique, according to an embodiment of the invention.

The magnetic alignment signature m can be characterized for the range of operating points $(I,\gamma)$ as well as for the selected excitation method described previously. Physical modeling and analysis can be used to produce the characteristics or experimental calibration can be used as well. Even though an operating point lies in a 2-dimensional space of $(I,\gamma)$, typically, desired operation resides on a single line in the space that meets certain requirements, such as maximum torque per ampere (MTPA). Therefore, the mapping doesn't need to cover the entire 2-dimensional space. As shown in FIG. 17, given the operating point $(I,\gamma)$ with current angle $\gamma$, the desired signature value m* as well as the desired signature error gain $K_m$ is produced from the mapping 96—with FIG. 17 illustrating that the signature error gain $K_m$ is the inverse of the slope of the mapping, i.e., slope=$1/K_m$.

Figure 16B:
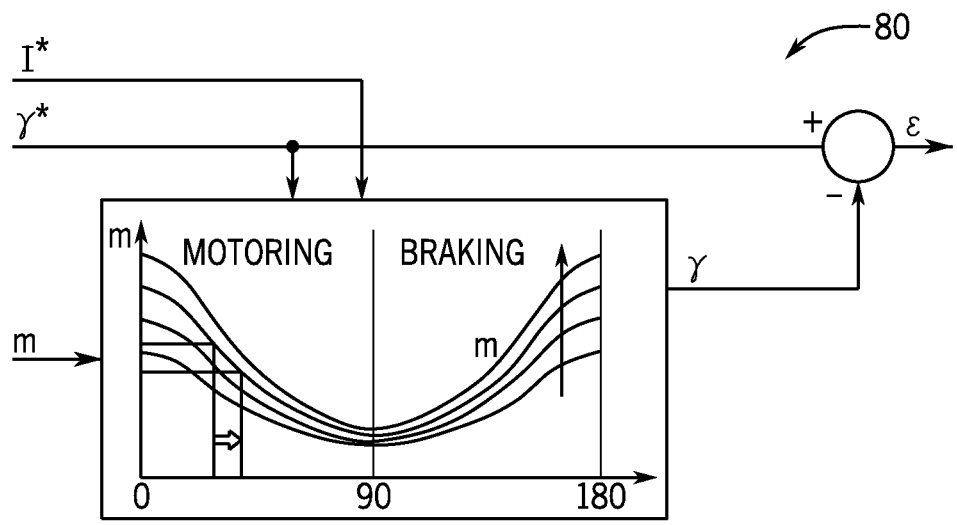
FIG. 16B is a block diagram of a magnetic alignment error estimation using an inverse/reverse mapping technique, implemented by the magnetic alignment error estimator of FIGS. 5B and 6B, according to an embodiment of the invention.

The above described approach (in FIG. 16A) utilizes a forward mapping for the signature profile to create an error from the signature error. This approach is effective when the magnetic alignment error $\varepsilon$ is small, and therefore the linear approximation of the profile is sufficient. However, when the error perturbation is large, inverse mapping can be utilized to generate the estimated magnetic alignment $\gamma$ from the signature value m, such as illustrated in FIG. 16B. In order to properly perform the inverse mapping, sections such as motoring and braking should be determined based on other signals such as commanded current angle, because the inverse mapping can have multiple inverse mapping points depending on the signature characteristics.

Figure 18:
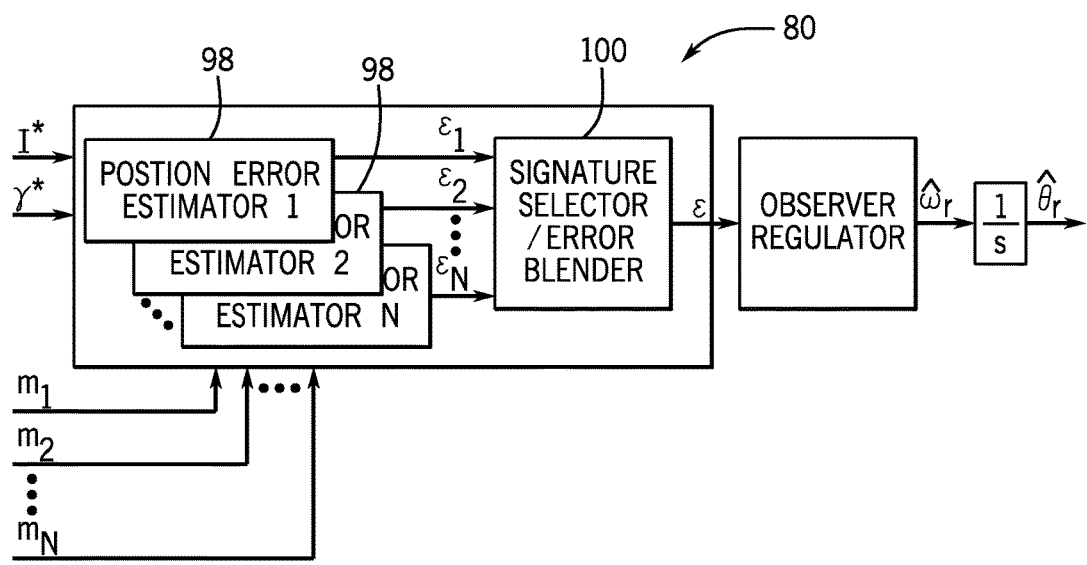
FIG. 18 is a block diagram illustrating a blending of multiple magnetic alignment errors, implemented by the magnetic alignment error estimator of FIGS. 5B and 6B, according to an embodiment of the invention.

It is recognized that, according to embodiments of the invention, multiple magnetic alignment signatures may be used for determining magnetic alignment in the AC electric machine—depending on the operating point(s) of the electric machine, as illustrated in FIG. 18. In using multiple signatures, multiple signatures may be used from a collection of signatures available/measured in a single operating range and/or different signatures may be used for different operating ranges. As an example, it may be desirable to use a current frame cross reluctance signature $\mathcal{R}_{qd}{}^i$ for zero or low current range operation of the electric machine, while it may be desirable to use $d^i$-axis reluctance $\mathcal{R}_d{}^i$ or the total reluctance R for medium to high torque range operation of the electric machine. In an occurrence of multiple signatures being extracted/used, $m_1, m_2 \ldots m_N$, a magnetic alignment error can be determined for each of the multiple signatures, i.e., $\varepsilon_1, \varepsilon_2 \ldots \varepsilon_N$, such as illustrated in FIG. 18—where multiple error estimators are shown as included in magnetic alignment error estimator 80. In utilizing multiple magnetic alignment signatures in a single operating range, blending of the magnetic alignment errors $\varepsilon_1, \varepsilon_2 \ldots \varepsilon_N$ can be performed via signature selector/error blender 100, with a single error value $\varepsilon$ output therefrom. In utilizing different magnetic alignment signatures for different operating ranges, instead of a hard jumping between use of such signatures, soft blending can be used in order to reduce the transient response during switching of signatures—such that the use measuring/use of multiple signatures m at one time might occur. In such an embodiment, selection of an appropriate/desired signature may be made by signature selector/error blender 100 to select an error $\varepsilon$ depending on the operating point $(I,\gamma)$. It should also be noted that it is also possible to have multiple observers, each tracking its own position. The tracked position is then blended with other position estimates of the other observers to obtain the position signal used for reference frame transformation between stationary and synchronous frame. When such an approach is used, an additional algorithm should be employed to prevent a sudden jump in position. As an example, the rated limited linear transition can be used.

Figure 19:
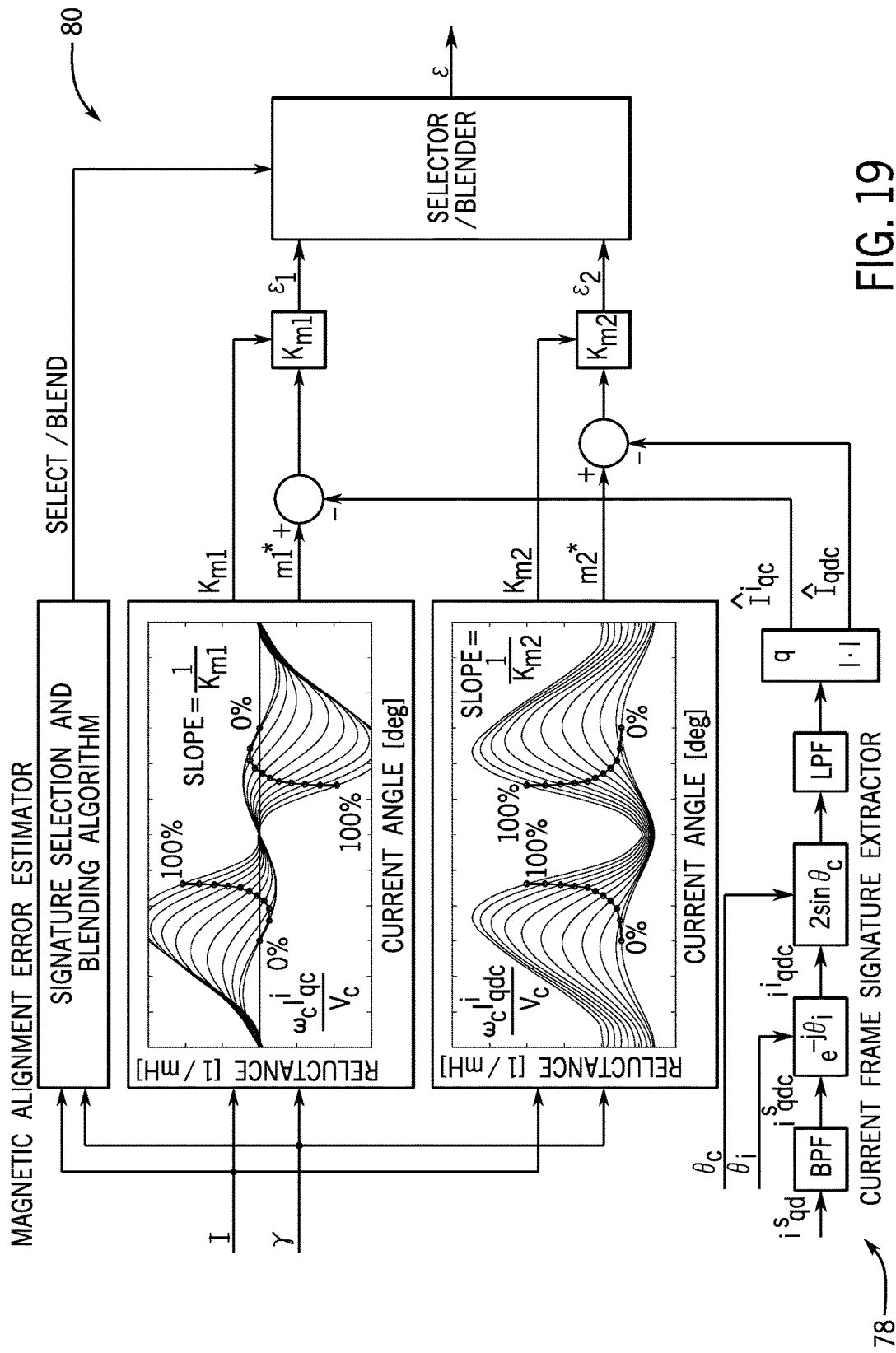
FIG. 19 is a detailed view of the magnetic alignment error estimator of FIGS. 5B and 6B estimating a magnetic alignment error using multiple magnetic alignment signatures and for a current frame voltage injection, according to an embodiment of the invention.

Referring now to FIG. 19, operations of the magnetic alignment error estimator 80 are illustrated for a specific implementation thereof where multiple magnetic alignments signatures are used. At zero and very low current level, the qi-axis carrier current $I_{qc}{}^i$ is used. But, for higher current levels, carrier current magnitude $\hat{I}_{qdc}$ is used.

As shown in FIGS. 7A, 7B, 8A, 8B, the magnetic alignment error $\varepsilon$ is output from error estimator 80 and provided to position observer 82, with it being recognized that there are various options of using the estimated magnetic alignment error $\varepsilon$ for sensorless control. This error can be used to directly drive the current excitation angle $\theta_i$ forward or backwards for direct magnetic alignment control. One reasonable approach is to use the error to drive an observer regulator in position observer 82 to estimate the rotor angular position $\hat{\theta}_r$. The observer regulator can be implemented as a PI regulator, with a second order integral term of the error being added on top of the PI regulator in improve the ramping tracking capability. The observer regulator can also drive an integrator, with a combination of the observer regulator and the integrator being equivalent to a PLL (Phase Locked Loop). One simple alternative approach is directly using the low pass filtered magnetic alignment error signal, and adding it to the previous current angle $\gamma$ or the rotor angle to determine the next current angle or the rotor position $\hat{\theta}_r$. This estimated electrical rotor angular position $\hat{\theta}_r$ may be fed back to the torque and flux controller 68, current controller 70 and signal injector 72 to provide sensorless control of the AC electric machine 64.

So far, pulsation signal injection has been described as a sinusoidal waveform injection. However, other waveforms such as square wave can be used as well. Typically, in practice, the injection signal is implemented using pulse width modulation (PWM) of switches (not shown) in the power converter 66. As the injection frequency is increased closer to the PWM frequency, the injection waveform will be composed of fewer number of PWM cycles. To an extreme, injection frequency can be identical to the PWM switching frequency, where the leading half of the PWM cycle and the latter half of the PWM cycle have different command value, leading to a pulsating injection at the PWM switching frequency. In a strict sense, the carrier injection signal will not look like a sinusoid or a 1-dimensional square wave as the injection frequency gets closer to the PWM switching frequency. However, proper sampling and filtering technique will help reduce the switching harmonics to a degree that the same concept of magnetic alignment signature extraction is applicable even to a case where the injection frequency is same as the PWM frequency.

The above described and illustrated embodiments of the invention are directed to a pulsating vector injection (current or voltage) applied in the current frame of the AC electric machine, with such pulsating vector injection producing a carrier response from which magnetic alignment signatures may be measured. It is recognized, however, that additional embodiments may utilize rotating vector injection in order to generate a carrier response—with such rotating vector injection being a rotating voltage vector injection or a rotating vector current injection.

If a rotating high frequency AC voltage $v_{qdc}^s$ is injected to stator windings of the AC electric machine that is superimposed on top of the primary excitation voltage, a rotating magnetic flux-linkage vector $\lambda_{qdc}^s$ can be injected to the machine. The rotating flux-linkage vector can be controlled (by adequately controlling the excitation voltage) to track a circular trajectory as defined by:

$$\lambda_{qdc}^s = \Lambda_c e^{j\omega_c t} \qquad \text{[Eqn. 28]},$$

where $\Lambda_c$ is the magnitude of the vector injection and $\omega_c$ is the frequency of the rotating injection.

Assuming the resistive voltage drop is either neglected or compensated, the rotating flux vector $\lambda_{qdc}^s$ can be implemented by a rotating vector injection voltage as defined by:

$$v_{qdc}^s = jV_c e^{j\omega_c t} = V_c(-\sin \omega_c t + j \cos \omega_c t) = \omega_c \Lambda_c(-\sin \omega_c t + j \cos \omega_c t) \qquad \text{[Eqn. 29]},$$

represented as a vector with magnitude $V_c$ rotating at frequency $\omega_c$.

Figure 20:
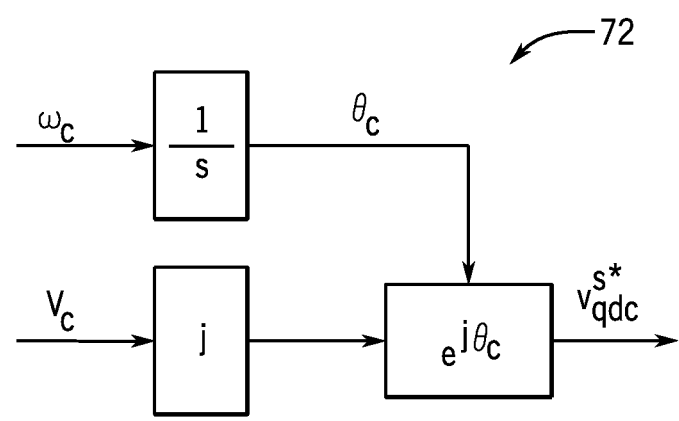
FIG. 20 is a block diagram of a rotating vector injection performed by the signal injector of FIGS. 5B and 6B, according to an embodiment of the invention.

Illustration of the operations performed and variables applied by the signal injector 72 in Equations [28] and [29] are illustrated in the block diagram of FIG. 20.

While the flux-linkage excitation $\lambda_{qdc}^s$ tracks a circular trajectory, the current response deviates from circular shape, because the rotating flux linkage will experience varying inductance of the motor depending on the rotor position and the loading. For a typical IPM machine, the high frequency current signature $i_{qdc}^s$ forms an elliptical shape, where the current magnitude is enlarged when the flux-linkage excitation is aligned to the low inductance d-axis. By tacking the long axis of the current response $i_{qdc}^s$, the rotor position can be tracked.

Given the saliency frame inductances $L_{max}$ and $L_{min}$, and saliency angle $\theta_\sigma$, a current response signature can be derived from the injected voltage $v_{qdc}^s$ according to:

$$i_{qdc}^s = I_{pc} e^{j\omega_c t} + I_{nc} e^{j(2\theta_\sigma - \omega_c t)} \qquad \text{[Eqn. 30]}$$

$$I_{pc} = \frac{V_c}{\omega_c} \frac{L_{max} + L_{min}}{2 L_{max} L_{min}} = \frac{V_c}{\omega_c} \frac{\mathcal{R}_{max} + \mathcal{R}_{min}}{2}.$$

$$I_{nc} = \frac{V_c}{\omega_c} \frac{L_{max} - L_{min}}{2 L_{max} L_{min}} = \frac{V_c}{\omega_c} \frac{\mathcal{R}_{max} - \mathcal{R}_{min}}{2}$$

While the positive sequence component $I_{pc}$ has fixed phase relative to the excitation angle $\theta_c$, the phase of the negative sequence component $I_{nc}$ contains the saliency angle information as $e^{j2\theta_\sigma}$. By extracting the positive sequence component magnitude $I_{pc}$ and the negative sequence component magnitude $I_{nc}$, inductance and reluctance parameters can be calculated. Also, by extracting the vector components of the negative sequence component from the high frequency current response $i_{qdc}^s$, saliency angle $\theta_\sigma$ can be calculated. The saliency frame inductance ($L_{max}$, $L_{min}$) and reluctance ($\mathcal{R}_{max}$, $\mathcal{R}_{min}$) values can be converted to current frame inductances ($L_q^i$, $L_d^i$, $L_{dq}^i$, $L_{dq}^i$) and reluctances ($\mathcal{R}_q^i$, $\mathcal{R}_d^i$, $\mathcal{R}_{dq}^i$, $\mathcal{R}_{dq}^i$) using the saliency angle $\theta_\sigma$ and the current vector angle $\theta_i$.

In an embodiment where a rotating high frequency AC current $i_{qdc}^s$ is injected to stator windings of the AC electric machine that is superimposed on top of the primary excitation current, the rotating vector injection current can be defined by:

$$i_{qdc}^s = jI_c e^{j\omega_c t} = I_c(\sin \omega_c t - j \cos \omega_c t) \qquad \text{[Eqn. 31]},$$

represented as a vector with magnitude $I_c$ rotating at frequency $\omega_c$.

Given the saliency frame inductances $L_{max}$ and $L_{min}$, and saliency angle $\theta_\sigma$, a voltage response signature can be derived from the injected current $i_{qdc}^s$ according to:

$$v_{qdc}^s = V_{pc} e^{j\omega_c t} - V_{nc} e^{j(2\theta_\sigma - \omega_c t)} \qquad \text{[Eqn. 32]}$$

$$V_{pc} = \omega_c I_c \frac{L_{max} + L_{min}}{2} = \omega_c I_c \frac{\mathcal{R}_{max} + \mathcal{R}_{min}}{2 \mathcal{R}_{max} \mathcal{R}_{min}}.$$

$$V_{nc} = \omega_c I_c \frac{L_{max} - L_{min}}{2} = \omega_c I_c \frac{\mathcal{R}_{max} - \mathcal{R}_{min}}{2 \mathcal{R}_{max} \mathcal{R}_{min}}$$

By extracting the positive sequence component magnitude $V_{pc}$ and the negative sequence component magnitude $V_{nc}$ in Equation [32], inductance and reluctance parameters can be calculated. Also, by extracting the vector components of the negative sequence component from the high frequency voltage response $v_{qdc}^s$, saliency angle $\theta_\sigma$ can be calculated. The saliency frame inductance ($L_{max}$, $L_{min}$) and reluctance ($\mathcal{R}_{max}$, $\mathcal{R}_{min}$) values can be converted to current frame inductances ($L_q^i$, $L_d^i$, $L_{dq}^i$, $L_{dq}^i$) and reluctances ($\mathcal{R}_q^i$, $\mathcal{R}_d^i$, $\mathcal{R}_{dq}^i$, $\mathcal{R}_{dq}^i$) using the saliency angle $\theta_\sigma$ and the current vector angle $\theta_i$.

Thus, as can be seen above, the advantage of rotating vector injection (voltage or current injection) is that it allows the extraction of all four components of the 2D inductance ($L_q^i$, $L_d^i$, $L_{dq}^i$, $L_{dq}^i$) and 2D reluctance ($\mathcal{R}_q^i$, $\mathcal{R}_d^i$, $\mathcal{R}_{dq}^i$, $\mathcal{R}_{dq}^i$).

An additional embodiment of the invention may perform a high frequency signal injection via an elliptical excitation scheme. It is recognized that, especially for high current high torque operation, high sensitivity and wide sensitivity range of the current frame q-axis signatures are advantageous for sensorless control. However, it is also desired to minimize the excitation level along the q-axis to keep the torque pulsation manageable, such that an elliptical excitation scheme would be desired compared to a rotating vector injection.

For embodiments where a current frame injection scheme is employed, an elliptical excitation scheme can be used in order to manipulate the excitation level of the current frame q-axis, with qi-axis variables being scaled according to:

$$\tilde{\lambda}_q^i = \alpha \lambda_q^i, \tilde{i}_q^i = \frac{1}{\alpha} i_q^i. \quad [\text{Eqn. 33}]$$

The resulting scaled inductance matrix can thus be derived as:

$$\delta \tilde{\lambda}_{qd}^i = \begin{bmatrix} \tilde{L}_q^i & \tilde{L}_{qd}^i \\ \tilde{L}_{dq}^i & \tilde{L}_d^i \end{bmatrix} \delta \tilde{i}_{qd}^i = \begin{bmatrix} \alpha^2 L_q^i & \alpha L_{qd}^i \\ \alpha L_{dq}^i & L_d^i \end{bmatrix} \delta \tilde{i}_{qd}^i. \quad [\text{Eqn. 34}]$$

By selecting the excitation frame as well as the scale α of the q-axis of the excitation frame, any elliptical excitation can be implemented by applying the rotating vector injection in the domains of scaled variables. Also, the scaled magnetic alignment parameters can be extracted using the same technique as the rotating vector injection, as described above in Equations [30] and [32]. The non-scaled magnetic alignment parameters can be simply calculated from the scaled parameters.

As set forth in detail above, embodiments of the invention thus provide a system and method for sensorless control of an electrical machine, where specific methods for injecting a high frequency carrier and measuring/analyzing magnetic alignment signatures may be employed, with preferred injection methods and preferred magnetic alignment signatures that are chosen being dependent on the operating point of the AC electric machine and on the dynamic state of the machine, so as to improve and maximize the performance of the position estimation. FIG. 21 presents a table summarizing the injection methods that might be injected and the magnetic alignment signatures that might be measured, according to embodiments of the invention, with the table also indicating the sensitivity of the listed signatures for a typical IPM machine and comparing the measured magnetic alignment signatures (in the current frame and the saliency frame) to saliency angle tracking and polarity detection as performed in the prior art.

Generally, FIG. 21 indicates that the saliency angle which is used in the prior art loses sensitivity to rotor position from medium torque levels and higher. On the other hand, the saliency frame signatures combined together provide fair sensitivity up to high torque level, however the region of the sensitivity for each $L_{min}$ and $L_{max}$ is quite limited. Therefore, it is necessary to combine both $L_{min}$ and $L_{max}$, or extract $L_\Sigma$ to establish magnetic alignment sensitivity over a desired operating range. The current frame signatures establish fairly good magnetic alignment sensitivity in general. In the current frame signatures, the cross inductance or cross reluctance parameters are ideal magnetic alignment parameters for zero and low current level sensitivity. The current frame d-axis (di-axis) inductance and reluctance can establish good sensitivity from low to medium torque range and fair sensitivity at high torque level, while current frame q-axis (qi-axis) inductance and reluctance have strong sensitivity at high torque level. Accordingly, it is found that use/measuring of a combination of current frame signatures can establish good magnetic alignment sensitivity over the whole operating range of the electric machine.

As shown in the table of FIG. 21, with a rotating vector injection of a high frequency signal (current or voltage)—which may be in the form of a rotating current vector injection, rotating voltage vector injection or elliptical excitation in the current frame—magnetic alignment signatures in the forms of all four inductance parameters ($L^i_{qd}$, $L^i_{dq}$, $L^i_d$, $L^i_q$) as well as the all four reluctance parameters ($R^i_{qd}$, $R^i_{dq}$, $R^i_d$, $R^i_q$) may be extracted, along with the saliency frame parameters such as saliency frame minimum inductance $L_{min}$, maximum inductance $L_{max}$, and saliency angle $\theta_\sigma$, and average inductance values $L_\Sigma$. Between those parameters, strong magnetic alignment sensitivity can be established across the whole operating range of the electric machine, although it is recognized that torque pulsation might be high in the electric machine when injecting signals utilizing rotating vector injection. Elliptical injection provides a good solution to manipulate the torque ripple while maintaining desired magnetic alignment sensitivity.

In one form of injecting a pulsating high frequency current signal, the signal may be injected on the current frame as either a d-axis injection, q-axis injection, switching d-axis/q-axis injection, or a profiled angle injection. For a pulsating current frame d-axis current injection, magnetic alignment signatures may be measured in the form of current frame cross inductance $L^i_{qd}$ and a current frame d-axis inductance $L^i_d$, with the di-axis current injection resulting in low torque pulsation in the electric machine. Between these two magnetic alignment signatures, good magnetic alignment sensitivity can be established up to medium or fair sensitivity at high torque level. For a pulsating current frame q-axis current injection, magnetic alignment signatures may be measured in the form of current frame cross inductance $L^i_{dq}$ and a current frame q-axis inductance $L^i_q$, each having good signal strength and sensitivity, with the q-axis injection resulting in a higher torque pulsation in the electric motor. Both methods can be blended by a switching d-axis/q-axis injection or by profiling the injection angle depending on the current or torque level. For the blended approaches, the signatures are either measured conditionally or are blended with each other.

In one form of injecting a pulsating high frequency voltage signal, the signal may be injected on the current frame as either a d-axis injection, q-axis injection, switching d-axis/q-axis injection, or a profiled angle injection. For a pulsating current frame d-axis voltage injection, magnetic alignment signatures may be measured in the form of current frame cross inductance $R^i_{qd}$ and a current frame d-axis inductance $R^i_d$. Between these two magnetic alignment signatures, good magnetic alignment sensitivity can be established up to medium or fair sensitivity at high torque level. For a pulsating current frame q-axis voltage injection, magnetic alignment signatures may be measured in the form of current frame cross inductance $R^i_{dq}$ and a current frame q-axis inductance $R^i_q$, each having good signal strength and sensitivity, with the q-axis injection resulting in a higher torque pulsation in the electric motor. Both methods can be blended by a switching d-axis/q-axis injection or by profiling the injection angle depending on the current or torque level. For the blended approaches, the signatures are either measured conditionally or are blended with each other. One special example for the profiled injection angle approach would be a minimum torque ripple approach at MTPA points, where the injection angle is profiled in a way that minimizes the torque ripple at the MTPA operating point.

In another form of injecting a pulsating high frequency signal (current or voltage), the signal may be injected as a minimum inductance axis (saliency d-axis) tracking injection or a maximum inductance axis (saliency q-axis) tracking injection. For a minimum inductance axis (saliency d-axis) tracking injection, the saliency frame minimum inductance $L_{min}$ and maximum reluctance Rmax may be measured as the magnetic alignment signature along with the saliency angle $\theta_o$, with the a minimum inductance axis (saliency d-axis) tracking injection resulting in low torque pulsation at low current levels and higher torque pulsation at high current levels. For a maximum inductance axis (saliency q-axis) tracking injection, the saliency frame maximum inductance $L_{max}$ and maximum reluctance Rmin may be measured as the magnetic alignment signature along with the saliency angle $\theta_o$, with the maximum inductance axis (saliency q-axis) tracking injection resulting in high torque pulsation in the electric motor.

Another method of injecting a pulsating high frequency signal is indicated in FIG. 21 as a "blended injection"—which combines rotating vector injection and pulsating injection. Such a blended injection may be employed to increase a q-axis injection during operation of the electric machine during transient or very high torque conditions, with elliptical injection providing a means to smoothly transition from pulsating injection to a rotating injection. For a blended current injection, the current frame cross inductance $L^i_{qd}$ and $L^i_{dq}$ as well as the current frame d-axis inductance $L^i_d$ may always be measured, while current frame q-axis inductance $L^i_q$ could be conditionally measured. For a blended voltage injection, the current frame cross reluctances $R^i_{qd}$ and $R^i_{dq}$ as well as the current frame d-axis reluctance $R^i_d$ may always be measured, while the current frame q-axis reluctance $R^i_q$ could be conditionally measured. Additionally, minimum inductance $L_{min}$, maximum inductance $L_{max}$, and average inductance values $L_{avg}$ could also be conditionally measured.

Thus, as can be seen in the table of FIG. 21, magnetic alignment signatures measured according to embodiments of the present invention, resulting from a selected method of high frequency signal injection, provide for sensorless control of an electric machine over a full operating range of speed and torque. This is compared to prior art sensorless control techniques that utilize saliency tracking based control methods, which are prone to the effects of magnetic saturation and phase error in position tracking and control of the machine and do not provide adequate sensorless control at low speed—high torque operation of the electric machine.

Figure 22:
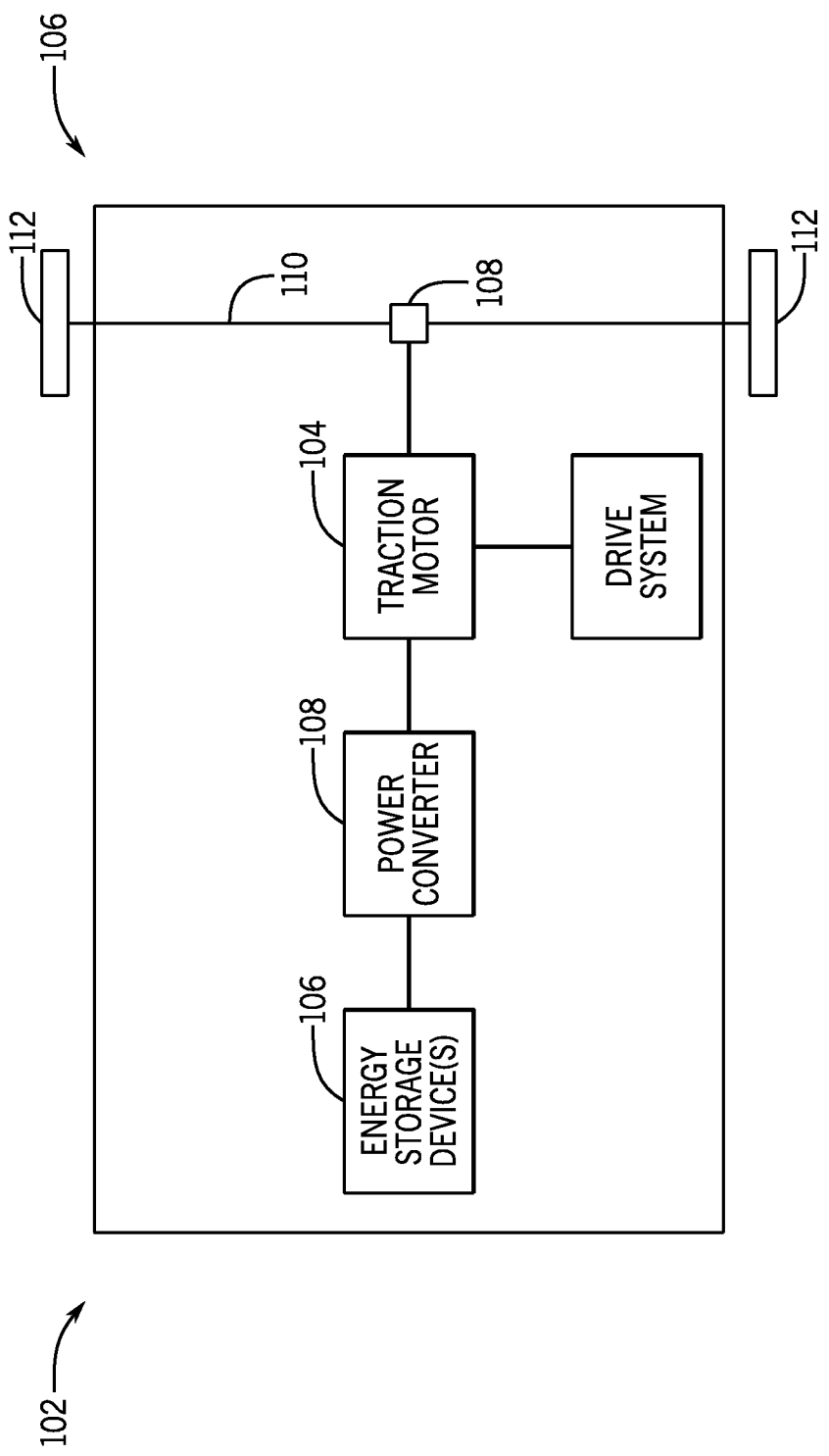
FIG. 22 is a block diagram of a vehicle incorporating the drive system of FIG. 5A or 6A to drive a traction motor, according to embodiments of the invention.

According to an embodiment of the invention, the drive system 60, 62 (FIGS. 5A and 6A), as discussed herein, may be used as a drive system for driving a traction or propulsion motor for virtually any vehicle. The magnetic alignment signature of an embodiment of the invention achieves strong sensitivity up to a very high torque level sufficient to enable the sensorless traction drive system for vehicle applications. Suitable vehicles for use include, but are not limited to, an off-highway vehicle (OHV), a locomotive, a mining vehicle, electric-motorized railcar, automobiles, trucks, construction vehicles, agricultural vehicles, airport ground service vehicles, fork-lifts, non-tactical military vehicles, tactical military vehicles, golf carts, motorcycles, mopeds, all-terrain vehicles, vessels, and the like. As an example, FIG. 22 illustrates an electric vehicle 102 having a vehicle propulsion system that incorporates an AC electric machine (EM) 104 that functions as a traction motor, with the traction motor 104 receiving power from one or more energy storage devices 106 and power converters 108 included in the vehicle 102. An output of the traction motor 104 connects to a vehicle traction system 106, to drive a differential 108 connecting a traction system drive shaft 110 to wheels 112. A drive system 114 in vehicle 102 drives traction motor 104 via a sensorless control technique, such as previously described with respect to drive system 60, 62 in FIGS. 5A and 6A, in order to provide propulsion to the vehicle 102.

A technical contribution of the present invention is that it provides a controller implemented technique for position estimation and sensorless control for an AC electric machine. The technique measures magnetic alignment signatures derived from a selected method of high frequency signal injection, with the magnetic alignment signatures being used to control an orientation of a primary excitation current vector provided to the AC electric machine, so as to achieve a desired magnetic operation of the AC electric machine.

Therefore, according to one embodiment of the invention, a drive system for driving an AC electric machine is configured to provide a primary current excitation to drive the AC electric machine, the primary current excitation comprising a current vector having a magnitude and angle. The drive system is also configured to inject a carrier signal to the AC electric machine that is superimposed onto the current vector, with the carrier signal being selected to generate a carrier response signal that has sensitivity to magnetic alignment information of the AC electric machine at its operating point. The drive system is further configured to measure at least one magnetic alignment signature of the AC electric machine from the generated carrier response signal and control an orientation of the current vector using the measured at least one magnetic alignment signature, so as to achieve a desired magnetic operation of the AC electric machine.

According to another embodiment of the invention, a method for position sensorless control of an AC electric machine includes generating a primary current excitation to drive the AC electric machine, the primary current excitation comprising a current vector having a current magnitude and current angle. The method also includes superimposing a high-frequency carrier voltage or current onto the current vector to generate a selected carrier response current or voltage, respectively, that has sensitivity to magnetic alignment information of the AC electric machine. The method further includes determining one or more magnetic alignment signatures of the AC electric machine from the carrier response current or voltage and controlling the current angle of the current vector driving the AC electric machine based on the one or more magnetic alignment signatures, in order to achieve a desired magnetic operation of the AC electric machine.

According to yet another embodiment of the invention, a drive system for use with an AC electric machine not having suitable sensitivity for saliency tracking sensorless control is provided. The drive system is configured to generate a primary excitation current vector to drive the AC electric machine, the primary excitation current vector having a current magnitude and current angle. The drive system is also configured to inject a carrier signal onto the primary excitation current vector, the carrier signal comprising one of a carrier voltage and a carrier current that is superimposed on the primary excitation current vector. The drive system is further configured to measure at least one magnetic alignment signature of the AC electric machine that is derived from a carrier response signal generated from the injected carrier signal and control an orientation of the primary excitation current vector using the measured at least one magnetic alignment signature, so as to achieve a desired magnetic operation of the AC electric machine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A drive system for driving an AC electric machine, the drive system comprising:
   an electric machine power converter configured to provide a primary current excitation to drive the AC electric machine, the primary current excitation comprising a current vector having a magnitude and angle; and
   a control system separate from or incorporated into the electric machine power converter, the control system configured to inject a carrier signal to the AC electric machine that is superimposed onto the current vector;
   wherein, in injecting the carrier signal, the control system is configured to inject a directional pulsating carrier signal at one or more angles aligned relative to the current vector, the directional pulsating injection of the carrier signal comprising one of a pulsating current injection and a pulsating voltage injection.

2. The control system of claim 1 wherein, in injecting the directional pulsating carrier signal, the control system is configured to perform one or more of:
   a current frame d-axis injection where the carrier signal is aligned tangentially to the current vector;
   a current frame q-axis injection where the carrier signal is aligned with the current vector; and
   a current frame carrier signal injection where the angle of the carrier signal relative to the current vector is a function of a current level or torque level provided to or produced by the AC electric machine.

3. The drive system of claim 2 wherein the control system is further configured to:
   measure at least one magnetic alignment signature of the AC electric machine from a carrier response signal generated responsive to the injected carrier signal; and
   control an orientation of the current vector using the measured at least one magnetic alignment signature.

4. The drive system of claim 3 wherein, for the directional pulsating injection, the at least one magnetic alignment signature comprises:
   at least one of a current frame d-axis inductance, a current frame cross inductance, and a composite of the current frame d-axis inductance and the current frame cross inductance, when the signal injector performs a current frame d-axis pulsating current injection;
   at least one of a current frame q-axis inductance, a current frame cross inductance, and a composite of the current frame d-axis inductance and the current frame cross inductance when the signal injector performs a current frame q-axis pulsating current injection;
   at least one of a pulsation axis inductance, a pulsation axis cross inductance, and a composite of the pulsation axis inductance and the pulsation axis cross inductance, when the signal injector performs a current frame carrier injection where the angle of the current injection relative to the current vector is a function of the current level or torque level.

5. The drive system of claim 3 wherein, for the directional pulsating injection, the at least one magnetic alignment signature comprises:
   at least one of a current frame d-axis reluctance, a current frame cross reluctance, and a composite of the current frame d-axis reluctance and the current frame cross reluctance, when the signal injector performs a current frame d-axis pulsating voltage injection;
   at least one of a current frame q-axis reluctance, a current frame cross reluctance, and a composite of the current frame q-axis reluctance and the current frame cross reluctance, when the signal injector performs a current frame q-axis pulsating voltage injection; and
   at least one of a pulsation axis reluctance, a pulsation axis cross reluctance, and a composite of the pulsation axis reluctance and the pulsation axis cross reluctance, when the signal injector performs a current frame carrier injection where the angle of the voltage injection relative to the current vector is a function of the current level or torque level.

6. The drive system of claim 3 wherein the control system is configured to:
   convert the carrier response signal to a lower frequency signal than the carrier signal, so as to eliminate a carrier modulation frequency;
   low pass filter the converted carrier response signal to determine vector components of the carrier response signal; and
   extract the at least one magnetic alignment signature from the vector components of the carrier response signal.

7. The drive system of claim 3 wherein, for each respective magnetic alignment signature of the at least one magnetic alignment signature, the control system is configured to:
   perform a forward mapping operation for a plurality of desired operating points for the AC electric machine to determine a desired magnetic alignment signature value and desired signature error gain for the magnetic alignment signature; and
   estimate a magnetic alignment error based on the magnetic alignment signature, the desired magnetic alignment signature value, and the desired signature error gain.

8. The drive system of claim 3 wherein, for each respective magnetic alignment signature of the at least one magnetic alignment signature, the control system is configured to:
   perform a reverse mapping operation for the magnetic alignment signature, at a desired operating point for the AC electric machine, to generate an estimated magnetic alignment signal; and
   estimate a magnetic alignment error based on the estimated magnetic alignment signal and based on a current angle of the desired operating point for the AC electric machine.

9. The drive system of claim 3 wherein, when the at least one magnetic alignment signature comprises multiple magnetic alignment signatures, the drive system is configured to:
   estimate a magnetic alignment error for each of the multiple magnetic alignment signatures; and
   perform a soft blending operation when switching from use of a first magnetic alignment signature for controlling the orientation of the current vector to use of a second magnetic alignment signature for controlling the orientation of the current vector the soft blending operation reducing a transient response during switching of magnetic alignment signatures.

10. The drive system of claim 3 wherein the control system is configured to determine a preferred injection method for injecting the carrier signal and select one or more specific magnetic alignment signatures of the at least one magnetic signature to control the orientation of the current based on one or more of the operating point of the AC electric machine and a dynamic state of the AC electric machine.

11. The drive system of claim 3 wherein the carrier response signal has sensitivity to magnetic alignment information of the AC electric machine at its operating point, the magnetic alignment information including at least one of a torque of the AC electric machine, the angle of the current vector in reference to a stator flux, the angle of the current vector in reference to a rotor flux, and the angle of the current vector in reference to a rotor pole axis.

12. The drive system of claim 1 wherein, in injecting the carrier signal, the control system is configured to perform a blended injection comprising both the directional pulsating injection of the carrier signal and a rotating vector injection of the carrier signal.

13. The drive system of claim 12 wherein the control system is further configured to:
measure at least one magnetic alignment signature of the AC electric machine from a carrier response signal generated responsive to the blended injection; and
control an orientation of the current vector using the measured at least one magnetic alignment signature;
wherein, for the blended injection, the at least one magnetic alignment signature comprises at least one of, or a composite of, a current frame d-axis inductance, a current frame cross inductance, a current frame d-axis reluctance, a current frame d-axis reluctance, a current frame cross reluctance, and one or more of a conditionally measured or blended current frame q-axis inductance, current frame q-axis reluctance, maximum inductance $L_{max}$, minimum inductance $L_{min}$, and average inductance $L_\Sigma$.

14. A vehicle comprising the drive system of claim 1 therein, and wherein the AC electric machine comprises a traction motor driven by the drive system.

15. A drive system for driving an AC electric machine, the drive system comprising:
a power converter configured to provide a primary current excitation to drive the AC electric machine, the primary current excitation comprising a current vector having a magnitude and angle; and
a control system separate from or incorporated into the power converter, the control system configured to:
inject a carrier signal to the AC electric machine that is combined with the current vector to generate at least one magnetic alignment signature in a current reference frame of the AC electric machine; and
control the angle of the primary excitation current vector using the at least one magnetic alignment signature.

16. The drive system of claim 15 wherein, in injecting the carrier signal, the control system is configured to perform a directional pulsating current or voltage injection comprising one or more of:
a current frame d-axis injection where the carrier signal is aligned tangentially to the current vector;
a current frame q-axis injection where the carrier signal is aligned with the current vector; and
a current frame carrier signal injection where the angle of the carrier signal relative to the current vector is a function of a current level or torque level.

17. The drive system of claim 16 wherein the at least one magnetic alignment signature comprises one or more of a current frame d-axis inductance or reluctance, a current frame cross inductance or reluctance, a composite of the current frame d-axis inductance or reluctance and the current frame cross inductance or reluctance, a current frame q-axis inductance or reluctance, a current frame cross inductance or reluctance, a composite of the current frame d-axis inductance or reluctance and the current frame cross inductance or reluctance, a pulsation axis inductance or reluctance, a pulsation axis cross inductance or reluctance, and a composite of the pulsation axis inductance or reluctance and the pulsation axis cross inductance or reluctance.

18. The drive system of claim 15 wherein, in injecting the carrier signal, the drive system is configured to perform a rotating vector injection comprising at least one of a rotating vector current injection, a rotating vector voltage injection, and an elliptical excitation in a current reference frame, the elliptical excitation being one of an elliptical injection with a fixed orientation or an elliptical injection with a rotating orientation that is varied based on an operating point of the AC electric machine and a sensitivity and torque ripple trade-off.

19. The drive system of claim 18 wherein the at least one magnetic alignment signature comprises one or more of, or a composite of, a maximum inductance $L_{max}$, a minimum inductance $L_{min}$, a composite signature comprising an average inductance $L_\Sigma$ or average reluctance $\mathcal{R}_\Sigma$, a current frame d-axis inductance, a current frame q-axis inductance, a current frame cross inductance, a current frame d-axis reluctance, a current frame q-axis reluctance, and a current frame cross reluctance.

20. A drive system for driving an AC electric machine, the drive system comprising:
an electric machine power converter configured to provide a primary current excitation to drive the AC electric machine, the primary current excitation comprising a current vector having a magnitude and angle; and
a control system separate from or incorporated into the electric machine power converter configured to:
inject a carrier signal to the AC electric machine that is superimposed onto the current vector;
measure at least one magnetic alignment signature of the AC electric machine derived from a carrier response signal generated from the injected carrier signal; and
control an orientation of the primary excitation current vector using the measured at least one magnetic alignment signature.

* * * * *